US012723436B2

(12) United States Patent
Heid

(10) Patent No.: US 12,723,436 B2
(45) **Date of Patent: *Sep. 1, 2026**

(54) MULTIPOINT LOCK ASSEMBLY FOR A SWINGING DOOR PANEL

(71) Applicant: Endura Products, LLC, Colfax, NC (US)

(72) Inventor: George E. Heid, Charlotte, NC (US)

(73) Assignee: Endura Products, LLC, Colfax, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/808,900

(22) Filed: Aug. 19, 2024

(65) Prior Publication Data

US 2024/0410200 A1 Dec. 12, 2024

Related U.S. Application Data

(63) Continuation of application No. 18/239,197, filed on Aug. 29, 2023, now Pat. No. 12,331,553, which is a (Continued)

(51) Int. Cl.
*E05C 9/04* (2006.01)
*E05B 59/00* (2006.01)

(Continued)

(52) U.S. Cl.
CPC ............ *E05B 63/044* (2013.01); *E05B 59/00* (2013.01); *E05B 63/08* (2013.01); *E05B 65/06* (2013.01);

(Continued)

(58) Field of Classification Search
CPC . E05B 59/00; E05B 63/08; E05C 9/04; E05C 9/22; Y10T 292/0834; Y10T 292/0846
See application file for complete search history.

(56) References Cited

U.S. PATENT DOCUMENTS

| | | | |
|---|---|---|---|
| 40,829 | A | 12/1863 | Erbe |
| 50,931 | A | 11/1865 | Halley |

(Continued)

FOREIGN PATENT DOCUMENTS

| | | | |
|---|---|---|---|
| CN | 105927067 | A | 9/2016 |
| FR | 2988759 | A1 | 10/2013 |
| GB | 2277954 | A | 11/1994 |

*Primary Examiner* — Carlos Lugo
(74) *Attorney, Agent, or Firm* — IceMiller LLP

(57) ABSTRACT

A multipoint lock assembly for a swinging door panel includes a mortise housing that is installed in a mortise along the non-hinged edge of the door panel. A latch operating mechanism and a lock operating mechanism are disposed in the mortise housing. Each of these mechanisms is designed to be operated with a standard rotary operator such as a handle or knob for the latch operating mechanism and a key and/or thumb turn for the lock operating mechanism. The latch operating mechanism is transitionable between left- and right-hand orientations and includes a deadlatch feature that prevents forced back-drive. Turning the key and or thumb turn of the lock operating mechanism extends a deadbolt and extends upper and lower shoot bolts from edges of the door. When extended, the shoot bolts also are secured against forced back-drive by unique mechanism configurations.

19 Claims, 20 Drawing Sheets

Related U.S. Application Data continuation of application No. 16/862,684, filed on Apr. 30, 2020, now Pat. No. 11,746,565.

(60) Provisional application No. 62/841,281, filed on May 1, 2019.

(51) Int. Cl.

| | |
|---|---|
| ***E05B 63/04*** | (2006.01) |
| ***E05B 63/08*** | (2006.01) |
| ***E05B 65/06*** | (2006.01) |
| ***E05C 9/22*** | (2006.01) |
| *E05B 17/20* | (2006.01) |

(52) U.S. Cl.

CPC .................. *E05C 9/04* (2013.01); *E05C 9/22* (2013.01); *E05C 9/041* (2013.01); *E05Y 2900/132* (2013.01)

(56) References Cited

U.S. PATENT DOCUMENTS

| | | | |
|---|---|---|---|
| 197,594 | A | 11/1877 | Brook |
| 284,381 | A | 9/1883 | Clark |
| 311,575 | A | 2/1885 | Fitzgerald |
| 1,338,713 | A | 5/1920 | Jay |
| 1,368,141 | A | 2/1921 | John |
| 1,456,466 | A | 5/1923 | Nichols |
| 1,985,176 | A | 12/1934 | Lamb |
| 2,327,070 | A | 8/1943 | Schlage |
| 2,410,462 | A | 11/1946 | Schlage |
| 2,961,264 | A | 11/1960 | Hillgren |
| 3,435,644 | A | 4/1969 | Hines |
| 3,672,714 | A | 6/1972 | Schultz |
| 3,910,613 | A | 10/1975 | Nolin |
| 3,999,789 | A | 12/1976 | Maurits et al. |
| 4,353,582 | A | 10/1982 | Eigemeier |
| 4,362,328 | A | 12/1982 | Tacheny et al. |
| 4,850,208 | A | 7/1989 | Weinerman et al. |
| 4,876,783 | A | 10/1989 | Campion et al. |
| 5,290,077 | A | 3/1994 | Fleming |
| 5,364,138 | A | 11/1994 | Dietrich et al. |
| 5,394,718 | A | 3/1995 | Hotzl |
| 5,404,737 | A | 4/1995 | Hotzl |
| 5,474,348 | A | 12/1995 | Palmer et al. |
| 5,490,699 | A | 2/1996 | Uyeda |
| 5,496,082 | A | 3/1996 | Zuckerman |
| 5,524,941 | A | 6/1996 | Fleming |
| 5,564,296 | A | 10/1996 | Theriault et al. |
| 5,683,127 | A | 11/1997 | Chamberlain |
| 5,685,584 | A | 11/1997 | Baren et al. |
| 5,715,715 | A | 2/1998 | Nunez |
| 5,933,086 | A | 8/1999 | Tischendorf et al. |
| 6,152,498 | A | 11/2000 | Lindqvist |
| 6,209,931 | B1 | 4/2001 | Von Stoutenborough et al. |
| 6,217,087 | B1 | 4/2001 | Fuller |
| 6,250,119 | B1 | 6/2001 | Flon |
| 6,266,981 | B1 | 7/2001 | von Resch et al. |
| 6,282,929 | B1 | 9/2001 | Eller et al. |
| 6,354,121 | B1 | 3/2002 | Frolov |
| 6,443,506 | B1 | 9/2002 | Su |
| 6,478,345 | B1 | 11/2002 | Viney |
| 6,532,779 | B2 | 3/2003 | Shen |
| 6,557,909 | B2 | 5/2003 | Morris |
| 6,688,656 | B1 | 2/2004 | Becken |
| 6,732,557 | B1 | 5/2004 | Zehrung |
| 6,793,253 | B2 | 9/2004 | Bruwer et al. |
| 6,810,699 | B2 | 11/2004 | Nagy |
| 6,880,871 | B2 | 4/2005 | Winardi |
| 6,929,293 | B2 | 8/2005 | Toenges |
| 6,971,686 | B2 | 12/2005 | Becken |
| 7,025,394 | B1 | 4/2006 | Hunt |
| 7,051,561 | B2 | 5/2006 | Moon et al. |
| 7,275,773 | B1 | 10/2007 | Weathersby et al. |
| 7,303,215 | B2 | 12/2007 | Moon et al. |
| 7,353,637 | B2 | 4/2008 | Harger et al. |
| 7,404,306 | B2 | 7/2008 | Walls et al. |
| 7,421,868 | B2 | 9/2008 | Matyko et al. |
| 7,497,486 | B1 | 3/2009 | Davis et al. |
| 7,520,152 | B2 | 4/2009 | Sabo et al. |
| 7,526,933 | B2 | 5/2009 | Meekma |
| 7,607,701 | B2 | 10/2009 | Levine |
| 7,634,928 | B2 | 12/2009 | Hunt |
| 7,677,067 | B2 | 3/2010 | Riznik et al. |
| 7,701,331 | B2 | 4/2010 | Tran |
| 7,707,862 | B2 | 5/2010 | Walls et al. |
| 7,752,875 | B2 | 7/2010 | Constantinou et al. |
| 7,849,718 | B2 | 12/2010 | Ambrass |
| 7,856,857 | B2 | 12/2010 | Tsai |
| 7,878,034 | B2 | 2/2011 | Alber et al. |
| 7,926,315 | B2 | 4/2011 | Poletti |
| 7,946,080 | B2 | 5/2011 | Ellerton et al. |
| 8,035,479 | B2 | 10/2011 | Tran |
| 8,061,166 | B2 | 11/2011 | Tsai |
| 8,146,392 | B2 | 4/2012 | Toepfer |
| 8,161,780 | B1 | 4/2012 | Huml |
| 8,199,011 | B2 | 6/2012 | Lu |
| 9,506,278 | B2 * | 11/2016 | Mattrisch .................. E05C 9/20 |
| 11,746,565 | B2 | 9/2023 | Heid |
| 2008/0256994 | A1 | 10/2008 | Walls et al. |
| 2023/0399874 | A1 | 12/2023 | Heid |

* cited by examiner

MULTIPOINT LOCK ASSEMBLY FOR A SWINGING DOOR PANEL

CROSS-REFERENCE TO RELATED APPLICATION

This application is a continuation of U.S. patent Ser. No. 18/239,197, filed Aug. 29, 2023, which is a continuation of U.S. patent application Ser. No. 16/862,684, filed Apr. 30, 2020, which claims priority to and the benefit of, U.S. Provisional Patent Application Ser. No. 62/841,281, filed May 1, 2019. The entire contents of each of the above listed patent applications are hereby incorporated by reference.

TECHNICAL FIELD

This disclosure relates generally to door locks and more specifically to multipoint locks and latch assemblies for swinging or hinged entry door panels.

BACKGROUND

Swinging doors having multipoint locking mechanisms are more secure than doors with single deadbolts. This is because a multipoint lock assembly employs multiple bolts to secure a door in its locked configuration. Multipoint locks can include a deadbolt that extends from the unhinged side of the door into a side jamb, an upper shoot bolt that extends from a top edge of the door into a header, and a lower shoot bolt that extends from a bottom edge of the door into a threshold. Although common in commercial door systems, multipoint locks are making more inroads into residential construction.

Multipoint lock assemblies for residential entry door applications typically require hardware such as handle sets, thumb turns, escutcheons, and the like that are unique to a particular brand or style of lock mechanism. Hardware for multipoint locks usually is ordered from a manufacturer or distributor at the same time as the lock assembly because the hardware is unique to the lock assembly. Retail availability of compatible multipoint lock hardware for a particular lock can be limited. Traditional cylindrical lock hardware is not designed to interface with multipoint locks and, while widely available in a variety of styles, is not an option for use with traditional multipoint lock assemblies.

A need exists for a multipoint lock system for hinged entry doors that is compatible with traditional cylindrical lock hardware so that choices and availability of hardware are greatly increased. A need also exists for such a multipoint lock system that is robust, reliable, smoothly operating, and resistant to tampering. It is to the provision of a multipoint lock system that meets these and other needs that the present disclosure is primarily directed.

SUMMARY

Briefly described, a multipoint lock system for a swinging entry door is disclosed. The lock system is compatible with and can be operated by traditional and widely available cylindrical lock hardware. A rotary or cylindrical latch and knob or handle is used to operate a main door latch for normal opening and closing of the door. A traditional rotary or cylindrical deadbolt activator is used to extend and retract a deadbolt and upper and lower shoot bolts simultaneously. The result is a secure multipoint locking system with a first point being a deadbolt extending into a door jamb or mullion for example, a second point being an upper shoot bolt extending into a header, and a third point being a lower shoot bolt extending into a threshold. Additional lock points and bolts can be integrated if desired. The system incorporates deadlatch mechanisms to prevent forced back-drive of the latch bolt when the door is closed and to prevent forced back-drive of the deadbolt and shoot bolts when the door is closed and locked.

Thus, a multipoint lock system is now disclosed that is compatible with widely available traditional cylindrical latch and deadbolt hardware, that retains all the functions and provides the security of a robust multipoint locking system, and that provides other advantageous functionality. These and other features, aspects, and advantages of the multipoint lock system of this invention will become clear upon review of the detailed description set forth below taken in conjunction with the accompanying drawing figures, which are briefly described as follows.

According to an embodiment of the present disclosure, a lock mechanism includes a latch operating mechanism and a latch. The lock mechanism is configured to be disposed within a door panel. The latch includes an inner portion and an outer portion. The inner portion is engaged by the latch operating mechanism such that the latch operating mechanism is capable of retracting the latch from an extended position in which the outer portion is configured to extend from an edge of the door panel and a retracted position in which the outer portion is substantially within the edge of the door panel. The latch has a left-hand swing orientation in which the latch is configured to operate with a left-handed door and a right-hand swing orientation in which the latch is configured to operate with a right-handed door. The latch being capable of transitioning between the left-hand swing orientation and the right-hand swing orientation by rotating the latch 180 degrees about a longitudinal axis thereof with the latch and the latch operating mechanism installed within a door panel. In the left-hand swing orientation, the latch is configured to interact with a door jamb or a strike plate to retract from the extended position and to return to the extended position when the left-handed door is closed to maintain the door panel in a closed position thereof with the respective left- or right-handed door.

In embodiments, the latch is configured to transition between the left-hand swing orientation and the right-hand swing orientation without disassembly of the lock mechanism or removal of the lock mechanism from the door panel. The latch mechanism may include an adjustment slot that is defined in the outer portion. The adjustment slot may be configured to be engaged to rotate the latch between the left-hand swing orientation and the right-hand swing orientation.

In some embodiments, the lock mechanism includes a latch retainer that is configured to be disposed about and receive the outer portion of the latch therethrough. The latch retainer may be configured to secure the latch in the left-hand swing orientation and the right-hand swing orientation. The lack mechanism may include a base and a first retainer spring that projects outwardly around the base. The first retainer spring may bias a retainer spring tab thereof outward such that the retainer spring tab is configured to be selectively nested in a notch to secure the latch in one of the left-hand swing orientation or the right-hand swing orientation.

In particular embodiments, the lock mechanism includes a mortise box that is configured to be disposed within a door panel, the latch operation mechanism may be disposed within the mortise box. The mortise box having an edge surface that is configured to be disposed along the edge of the door panel. The edge surface may include a latch opening defined therethrough. The latch may extend through the latch opening. The edge surface may define a groove around the latch opening, a first notch, and a second notch. The first and second notches may extend outward from the groove with the first notch being opposite the second notch. The retainer spring tab may be nested in the first notch in the left-hand swing orientation and in the second notch in the right-hand swing orientation. The lock mechanism may include a face plate secured over the edge surface of the mortise box such that the face plate retainer the latch retainer in the groove. When the latch is between the left-hand swing orientation and the right-hand swing orientation the retainer spring tab may be disposed within the groove. Upon rotation of the latch from the left-hand swing orientation or the right-hand swing orientation, the retainer spring tab may engage walls defining the respective notch to urge the retainer spring tab inward against bias of the first retainer spring such that the retainer spring tab is disposed within the groove as the latch is rotated between the left-hand swing orientation and the right hand-swing orientation.

In certain embodiments, a door panel assembly includes a door panel having a hinged edge, a lock edge, a top edge, a bottom edge, a first face, and a second face. The door panel assembly also includes a lock mechanism as described herein disposed between the first and second faces adjacent the lock edge.

In another embodiment of the present disclosure, a door panel assembly includes a door panel, a latch operating mechanism, and a latch. The door panel including a hinged edge, a lock edge, a top edge, a bottom edge, a first face, and a second face. The hinged edge is configured to be secured by hinges to a door frame as a left-handed swing door or a right-handed swing door. The door panel including a mortise pocket that is defined between the first and second faces adjacent the lock edge. The latch including an outer portion and an inner portion. The latch has an extended position in which the outer portion extends from the lock edge and a retracted position in which the outer portion is disposed substantially within the door panel. The outer portion terminates in an angled surface that is configured to engage a door jamb or a strike plate to transition the latch from the extended position to the retracted position as the door panel is swung to a closed position. The latch having a left-hand swing orientation in which the angled surfaces faces the first face of the door panel and a right-hand swing orientation in which the angled surfaced faces the second face of the door panel. The latch rotatable about a longitudinal latch axis to transition the latch between the left-hand swing orientation and the right-hand swing orientation which the latch and the latch operating mechanism installed within the mortise pocket.

In embodiments, the lock mechanism includes a mortise box disposed within the mortise pocket of the door panel. The lock mechanism may be disposed within the mortise box. The outer portion may have a first flat and a second flat that extend parallel to the longitudinal latch axis. The first flat having a length greater than the second flat in a direction parallel to the longitudinal latch axis. The first flat may be opposite the second flat. The angled surface may extend from an outer terminal edge of the first flat to an outer terminal edge of the second flat. The lock mechanism may further include a latch retainer that is disposed abut the outer portion of the latch and rotatably fixed relative to the latch. The latch retainer may include a retainer spring tab that is nested in a first notch of the mortise box when the latch is in the left-hand swing orientation and the retainer spring tab nested in a second notch of the mortise box when the latch is in the right-hand swing orientation, the first notch opposite the second notch.

In some embodiments, the inner portion of the latch includes a latch shaft and a latch button. The latch shaft may extend along the longitudinal latch axis of the latch into the mortise box and terminating in the latch button. The latch operating mechanism may include a latch drive and a pair of legs that extend from the latch drive towards the latch button. Each leg may have a retractor finger that is engaged with the latch button and be configured to retract the latch button such that the latch is retracted. The latch button may remain engaged by the retractor fingers as the latch button is rotated bout the longitudinal axis of the latch. The latch may be configured to transition between the left-hand swing orientation and the right-hand swing orientation without disassembly of the lock mechanism or removal of the lock mechanism form the door panel.

In certain embodiments, the door panel assembly further includes a deadbolt, a first auxiliary retainer, a second auxiliary retainer, and a deadbolt operating mechanism. The deadbolt has an extended position in which the deadbolt extends from the lock edge of the door panel and a retracted position in which the deadbolt is disposed substantially within the door panel. The first auxiliary retainer is disposed about the deadbolt and the latch. The first auxiliary having an extended position in which the first auxiliary retainer extends from the top edge or the lock edge of the door panel and a retracted position in which the first auxiliary retainer is disposed substantially within the door panel. The second auxiliary retainer is disposed below the deadbolt and the latch. The second auxiliary retainer having an extended position in which the second auxiliary retainer extends from the bottom edge or the lock edge of the door panel and a retracted position in which the second auxiliary retainer is disposed substantially within the door panel. The deadbolt operating mechanism is configured to transition the deadbolt, the first auxiliary retainer, and the second auxiliary retainer between the respective extended and retracted positions in concert with one another. The deadbolt operating mechanism including a four bar linkage. The deadbolt operating mechanism configured to increase a rotational force applied to the deadbolt operating mechanism to reduce a force required to extend the deadbolt, the first auxiliary retainer and the second auxiliary retainer is decreased. In the extended position of each of the deadbolt, the first auxiliary retainer, and the second auxiliary retainer, the four bar linkage is in a past center configuration that prevents back driving of the four bar linkage from each of the deadbolt, the first auxiliary retainer, and the second auxiliary retainer. The deadbolt operating mechanism may also include a drive lever, a driver linkage, an upper drive arm, and a lower drive arm. The four bar linkage may be formed by an upper drive link, a lower drive link, an upper scissor link, and a lower scissor link. The driver lever is coupled to a first end of the driver linkage. A second end of the driver linkage that is opposite the first end that is coupled to a first end of the upper drive link. The first end of the lower drive link that is coupled to the upper drive link that is adjacent the first end thereof. The upper drive arm is coupled to a second end of the upper drive link is opposite the first end thereof. The first end of the upper scissor link is coupled to the upper drive link adjacent the second end thereof. The lower drive arm is coupled to a second end of the drive link that is opposite the first end thereof. The first end of the lower scissor link is coupled to the lower drive link adjacent the second end thereof. A second end of each of the upper and lower scissor links are coupled to on another. The upper drive arm is operably coupled to the first auxiliary retainer such that the first auxiliary retainer transitions between the extended and retracted positions thereof in response to translation of the upper drive arm along a longitudinal axis thereof. The lower drive arm is operably coupled the second auxiliary retainer such that the second auxiliary retainer transitions between the extended and retracted position thereof in response to translation of the lower drive arm along a longitudinal axis thereof. The deadbolt is operably coupled to the second end of the lower drive link. The driver lever and the driver linkage may increase a rotation force applied to the driver lever such that a force required to extend the deadbolt, the first auxiliary retainer, and second auxiliary retainer is decreased.

In particular embodiments, the door panel assembly includes a deadbolt, a first auxiliary retainer, a drive rod, and a deadbolt operating mechanism. The deadbolt has an extended position in which the deadbolt extends from the lock edge of the door panel and a retracted posing in which the deadbolt is disposed substantially within the door panel. The first auxiliary retainer is disposed above the deadbolt and the latch. The first auxiliary has an extended position in which the first auxiliary retainer that extends from the top edge or the lock edge of the door panel and a retracted position in which the first auxiliary retainer is disposed substantially within the door panel. The drive rod has a first end that is operably coupled to the first auxiliary retainer and a second threaded end opposite the first end. The deadbolt operating mechanism is configured to transition the deadbolt and the first auxiliary retainer between the respective extended and retracted positions in concert with one another. The deadbolt operating mechanism includes a drive arm that extends towards the first auxiliary retainer. The drive arm including a drive rod dock that includes a tapered guide and a threaded bore. The tapered guide is configured to guide a threaded end of the drive rod into the threaded bore.

In another embodiment of the present disclosure, a method of rehanding a lock mechanism includes engaging a latch of a lock mechanism with the lock mechanism fully installed in a door panel with the latch in one of a left-hand swing orientation or a right-hand swing orientation and rotating the latch 180 degrees about a longitudinal axis of the latch to transition the latch to the other of the left-hand swing orientation or the right-hand swing orientation with the lock mechanism remaining fully installed in the door.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are incorporated in and constitute a part of this specification, wherein.

DETAILED DESCRIPTION

Figure 1:
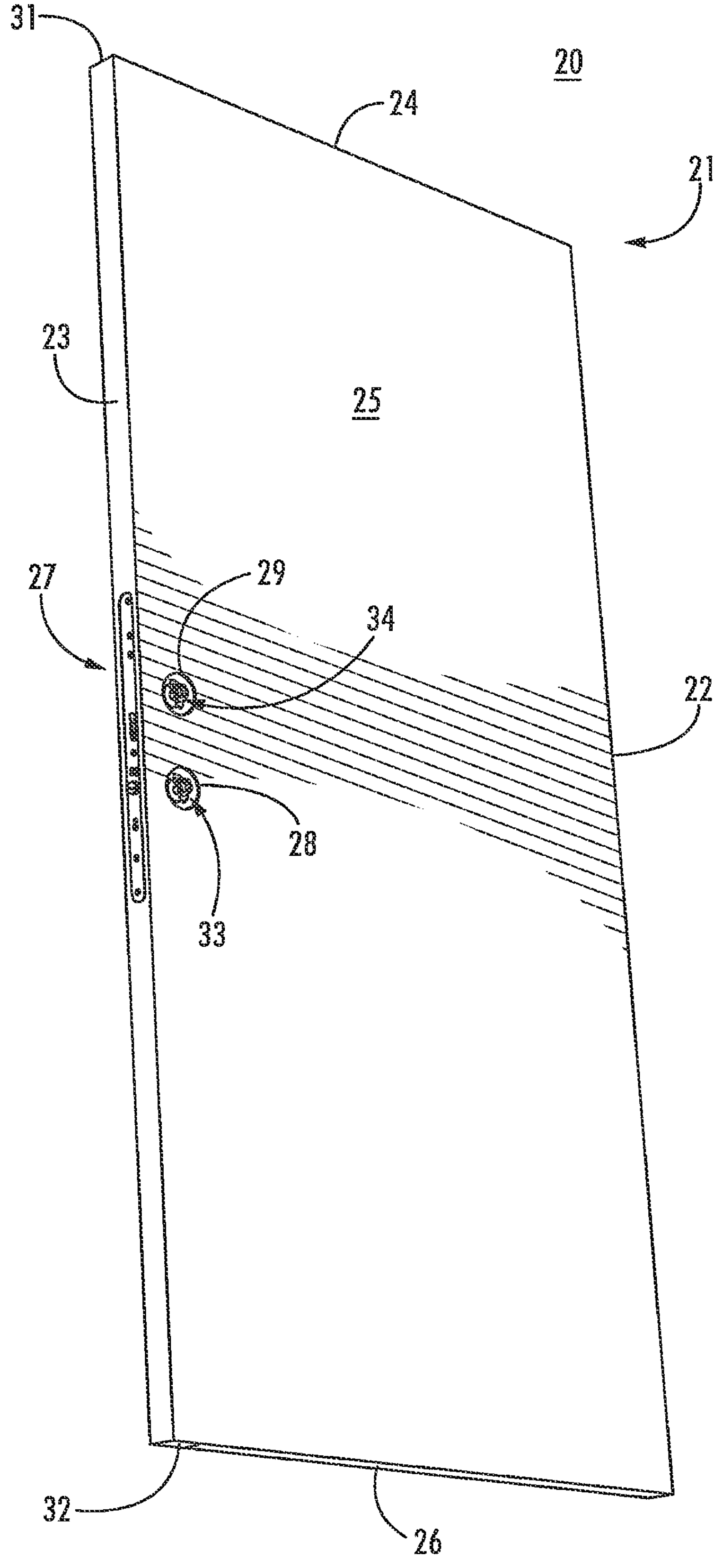
FIG. 1 is a perspective view of a hinged or swinging door panel fitted with a multipoint lock system that embodies principles of the invention in one preferred form.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

With reference to FIG. 1, a swinging or hinged door panel assembly 20 provided in accordance with an embodiment of the present disclosure having a door panel 21 and a lock assembly 27. The door panel 21 has a hinged edge 22, a lock or non-hinged edge 23, a top edge 24, a bottom edge 26, a first face 25, and a second face (not explicitly shown). A multipoint lock mechanism or assembly 27 according to the present invention is nested in a mortise pocket in the non-hinged edge 23 of the door. The lock assembly 27 includes a latch operating mechanism 33 accessible through a latch operator hole 28 in the door panel 21 and a deadbolt operating mechanism 34 accessible through a deadbolt operator hole 29. The operator holes 28 and 29 are of a standard size and at standard positions for traditional rotary latch and deadbolt operators including traditional cylindrical latch and deadbolt hardware. An upper auxiliary retainer or upper shoot bolt assembly 31 is mounted in the top edge 24 of the door panel 21 and a lower auxiliary retainer or lower shoot bolt assembly 32 is mounted in the bottom edge 26, as detailed more fully below. In some embodiments, the upper auxiliary retainer and/or the lower auxiliary retainer may extend from the lock edge 23.

Figure 2:
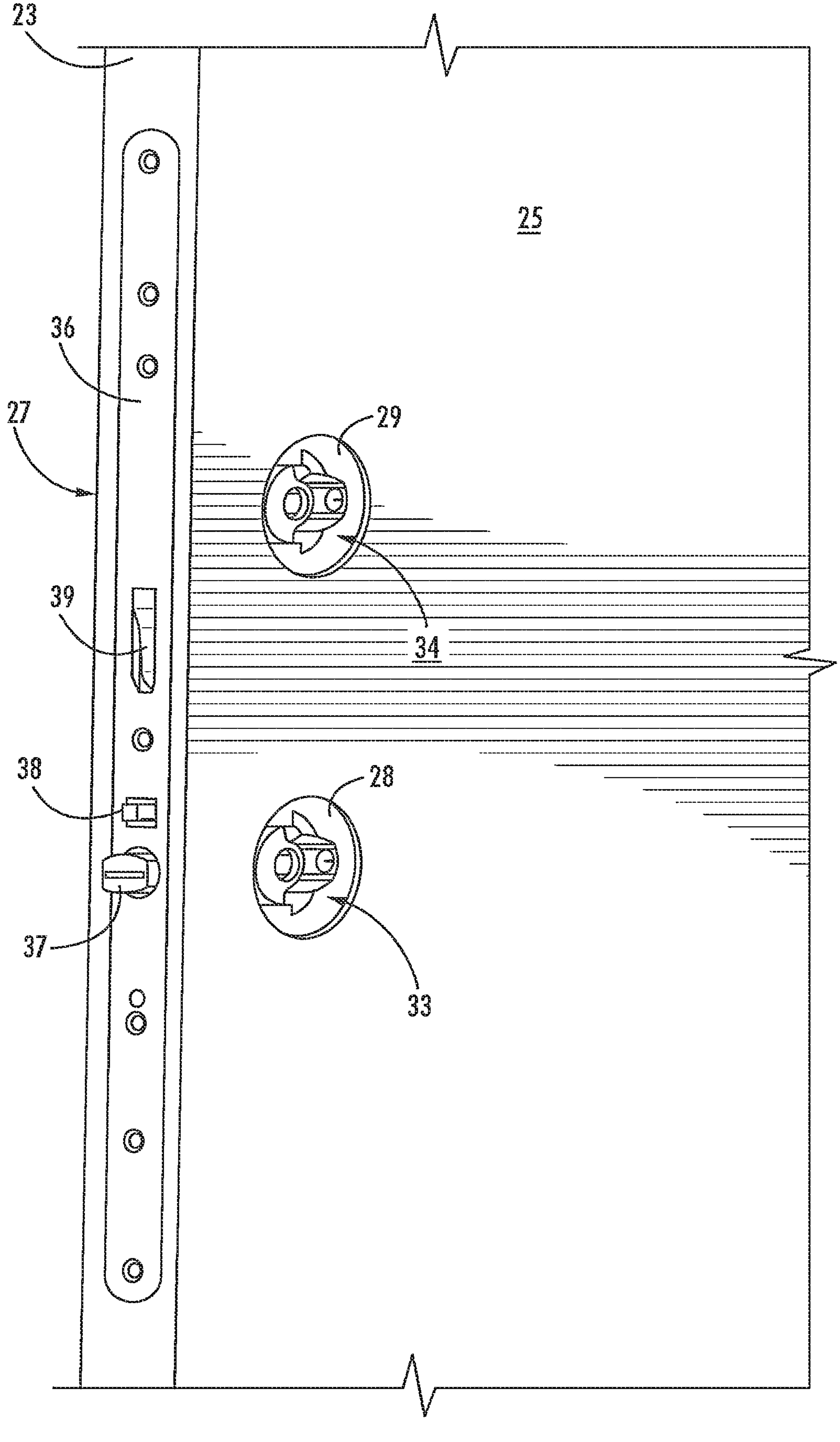
FIG. 2 is an enlarged perspective view of a portion of the unhinged edge of the door panel of FIG. 1 showing the multipoint lock system embedded in a mortise formed along the door edge.

FIG. 2 is an enlarged perspective of the multipoint lock assembly 27 installed in the mortise pocket of the door panel 21. The assembly 27 includes a face plate 36 through which a main latch 37 retractably extends. The latch operating mechanism 33 receives a rotary operator (e.g. a knob or a handle) for extending and retracting the main latch 37 when the operator is rotated. A dead latch button 38 extends from an opening in the face plate adjacent the main latch 37 for purposes to be explained in more detail below. A deadbolt 39, seen in its retracted position in FIG. 2, is extendable and retractable through an opening in the face plate 36. In the retracted position, the deadbolt 39 is substantially within the unhinged edge of the door panel 21 such that a portion of the deadbolt 39 may extend from the unhinged edge in a gap between the unhinged edge and a doorjamb (FIG. 4) but not extending a distance such that the deadbolt 39 interferes with the door panel 21 swinging between an open and closed position thereof. The deadbolt operating mechanism 34 receives a standard cylindrical rotary deadbolt operator that can be rotated with a key and/or a thumb turn. Rotation of the deadbolt operator extends and retracts the deadbolt 39 as well as the upper and lower shoot bolts of assemblies 31 and 32.

Figure 2A:
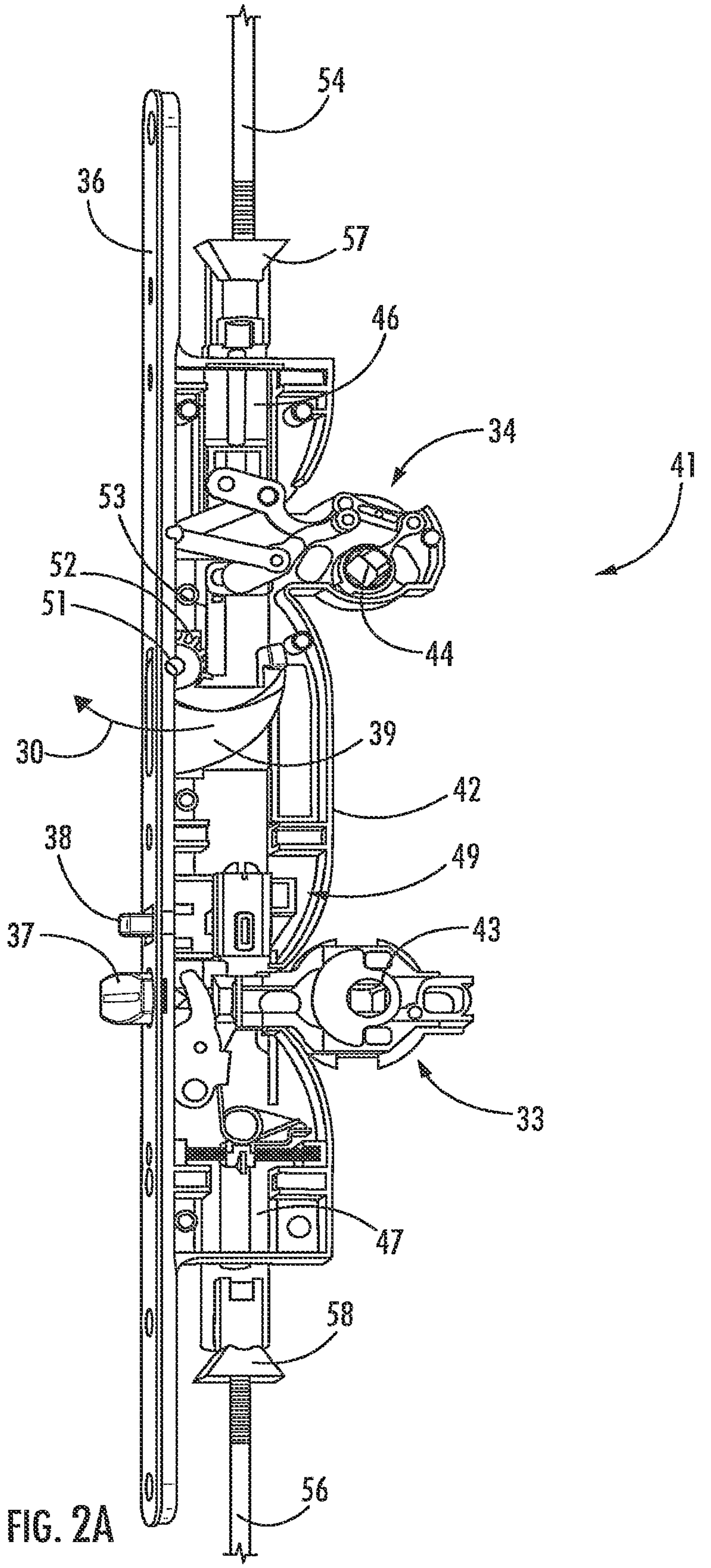
FIG. 2*a* is a side perspective view of a multipoint lock assembly according to principles of the present invention shown with a portion of the casing removed to show internal components.

FIG. 2*a* is a side perspective showing a multipoint lock mechanism that embodies the present invention in one exemplary form. The mechanism 41 includes a mortise box 42, which is shown here with its cover plate removed to reveal more details of the mechanism. The latch operating mechanism 33 includes a latch drive 43 that receives the spindle of a rotary latch operator such as a door knob or handle. Rotation of a latch operator rotates the spindle and the latch drive 43. The deadbolt operating mechanism 34 includes a deadbolt drive 44 that receives the spindle of a rotary deadbolt operator. Rotation of a key and/or thumb turn of a deadbolt operator rotates the spindle and deadbolt drive 44. A deadlatch mechanism 49 is coupled to the deadlatch button 38 and functions to prevent forced back-drive of the main latch 37 when the door is closed, as detailed more fully below.

An upper drive bar 46 is coupled to the deadbolt operating mechanism 34 at its lower end and is threaded to an upper drive rod 54 at its upper end. An upper drive bar dock 57 helps guide the threads of the upper drive rod 54 into a threaded opening of the upper drive bar 46 when the drive rod 54 is installed. Likewise, a lower drive bar 47 is coupled to the deadbolt operating mechanism 34 at its upper end and is threaded to a lower drive rod 56 at its lower end. A lower guide bar dock 58 helps guide the threads of the lower drive rod 56 into a threaded opening of the lower drive bar 47 when the lower drive rod 56 is installed.

The deadbolt 39 of the mechanism 34 is pivotally attached to the mortise box 42 via pivot pin 51 so that the deadbolt 39 can pivot from its retracted position shown in FIG. 2*a* to an extended position, as indicated by the arrow 30. A pinion gear 52 is formed in the deadbolt 39 extending partially around the location of the pivot pin 51. A cooperating rack gear 53 is formed in the lower guide bar 47 and the rack gear meshes with the pinion gear of the deadbolt 39. Movement of the lower guide bar 47 and thus the rack gear 53 in a downward direction causes the rack gear to drive the pinion gear thereby moving the deadbolt 39 to its extended position. In this position, the deadbolt extends into a deadbolt strike secured to a frame of an entryway to lock the door panel 21 (FIG. 1) in its closed position.

Figure 3:
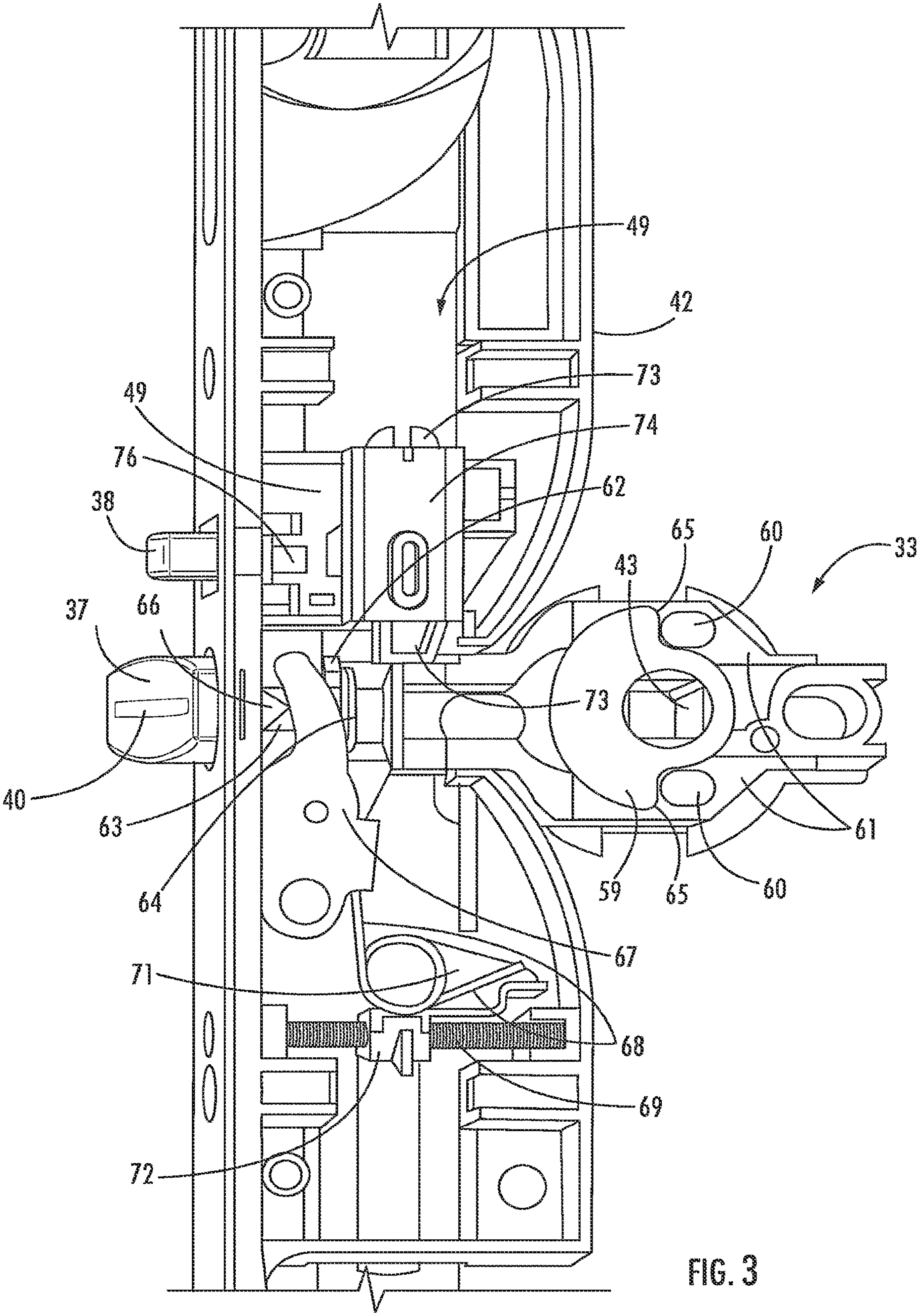
FIG. 3 is an enlarged side perspective view of the multipoint lock assembly showing the door latch mechanism thereof as it appears in its unlatched condition.

FIG. 3 is an enlarged perspective showing components of the latch and deadlatch of the mechanism. The main latch 37 includes an outer portion that engages a doorjamb and an inner portion within the mortise box 42 of the assembly. The inner portion of the main latch 37 is configured with a latch shaft 63 that terminates in a latch button 64. A tensioning cam 66 is formed on the latch shaft 63 for purposes explained in detail below. The latch drive 43 is coupled to a latch drive plate 59 in such a way that these two components rotate together.

A retractor bar has legs 61 that straddle the latch drive 43. The retractor bar terminates on the left in FIG. 3 in a pair of retractor fingers 62 located behind the latch shaft button 64. The legs 61 of the retractor bar are formed with two projections 60 that reside behind lobes 65 formed in the latch drive plate 59. With this configuration, it will be seen that rotation of the latch drive plate 59 in either direction as a result of turning a door handle pushes the projections 60 to the right in FIG. 3. This in turn retracts the main latch 37 allowing the door to be opened.

A latch tension arm 67 has a lower portion pivotal about a pivot pin and an upper portion that bears against tensioning cam 66 of the main latch 37. The latch tension arm 67 is yieldably biased into engagement with the tensioning cam 66 by an arm 68 of a torsion spring cradled in a spring holder 71. The spring traveler 72 can be adjusted to the right or left by turning a captured adjustment screw 69 threaded through a traveler 72 coupled to the spring holder 71. The adjustment screw 69 is accessible through an adjustment port in the face plate of the assembly as shown. Adjustment of the spring holder 71 to the left increases the tension of the spring on the tension arm 67 and adjustment to the right decreases the tension. The tension arm 67 yieldably urges the main latch 37 to its extended position. Adjusting the tension spring therefore adjusts the amount of force needed to move the main latch 37 to its retracted position. Thus, the main latch 37 tension can be adjusted so that a door closes and latches smoothly regardless of the size and weight of the door panel.

Figure 4:
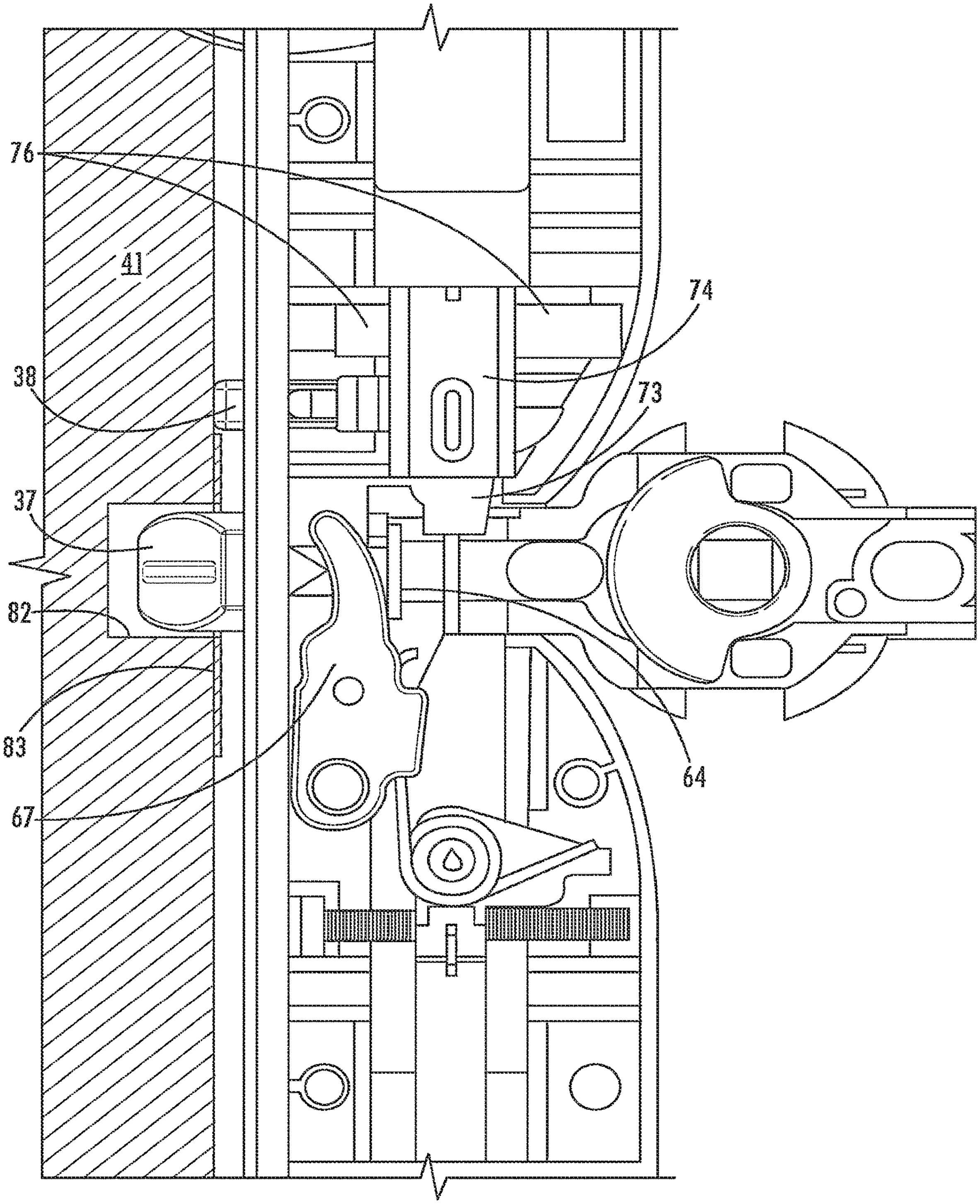
FIG. 4 is an enlarged side perspective view of the multipoint lock assembly showing the door latch mechanism thereof as it appears in its latched condition.
Figure 5:
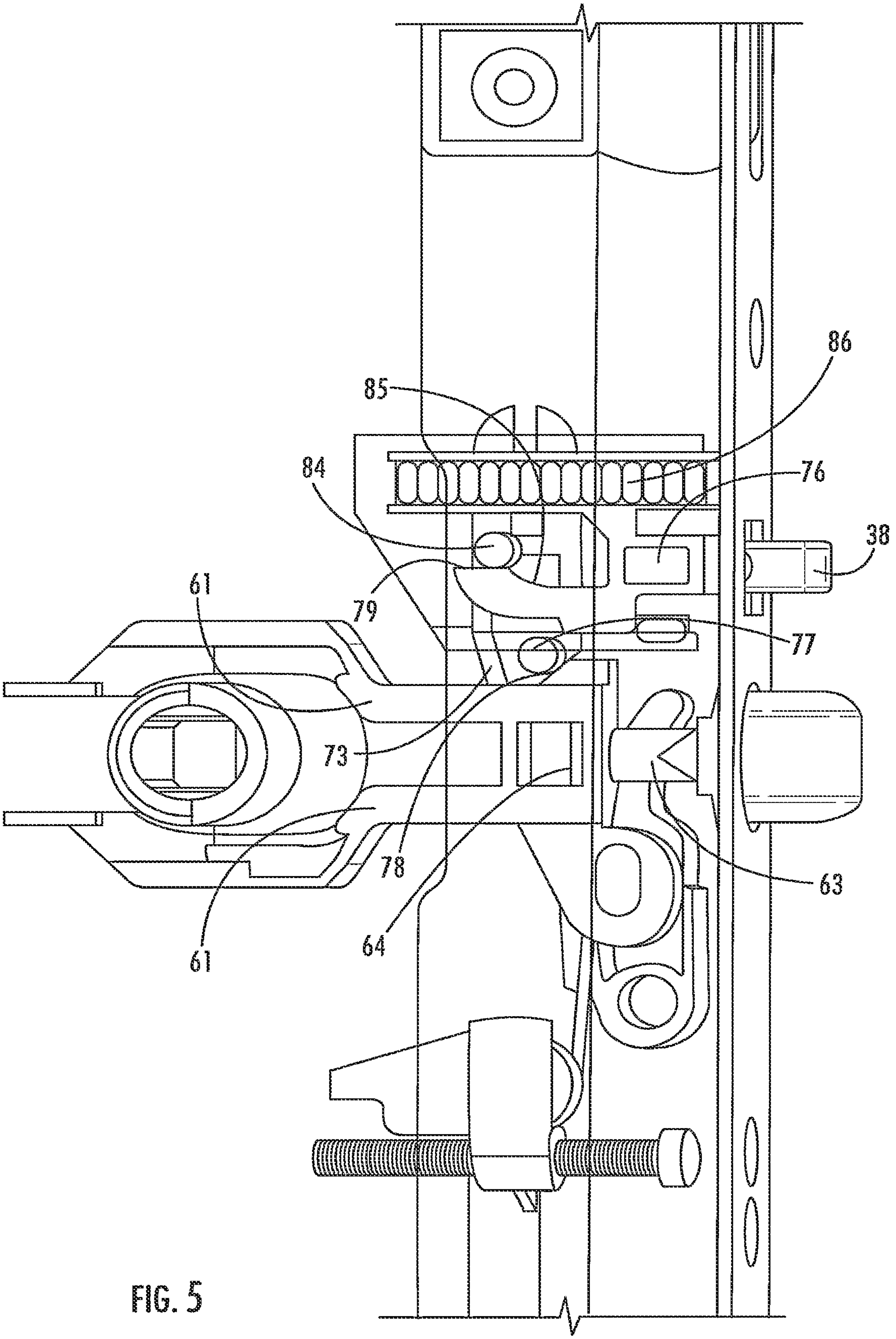
FIG. 5 is an enlarged perspective view of the latch mechanism with selective components removed to show the function of the deadlatch feature of the latch mechanism.

Referring to FIGS. 3, 4 and 5 simultaneously, a deadlatch mechanism 49 is disposed above the main latch 37 and is operatively coupled to the deadlatch button 38. The purpose of the deadlatch mechanism 49 is to prevent the forced back-drive of the main latch 37 by a would-be intruder when the door panel is closed but not dead bolted. The deadlatch mechanism 49 includes a deadlatch holder 74 within which a deadlatch arm 73 is contained. The deadlatch arm 73 is slidable between a raised or inoperative position as shown in FIG. 3 and a lowered operative position as shown in FIG. 4. A deadlatch operator 76 is mounted adjacent the deadlatch arm 73 and is slidable horizontally with respect to the deadlatch arm 73 between a first position as shown in FIGS. 3 and 5 when the door is open and a second position as shown in FIG. 4 when the door is closed. The deadlatch operator is yieldably biased to its first position by a spring 86.

The deadlatch button 38 is in its fully extended position as shown in FIGS. 3 and 5 whenever the door panel is open. Under these conditions, the deadlatch operator 76 is biased fully to its first position (to the right in FIG. 5) by spring 86 such that a cam pin 84 of the latch arm 73 rests atop a land 79 of a curved cam surface 85. The cam pin 84 and the therefore the deadlatch arm 73 are thus held in the raised position so that the bottom section of the deadlatch arm 73 resides above the latch shaft button 64 as shown in FIG. 3. The main latch 37 can thus be manually pressed in and out of the mortise box 42 since the latch shaft button bypasses the bottom section of the raised deadlatch arm 73.

Referring to FIG. 4, when the door panel is closed, the main latch 37 extends to through a strike plate 83 into a latch pocket 82 in the jamb 41 of a doorway. At the same time, the deadlatch button 38 is pivoted to one side when the button 38 engages the doorjamb. This in turn forces the deadlatch arm operator to move to the right in FIG. 4 (to the left in FIG. 5) against the bias of spring 86 (FIG. 5). As this movement of the deadlatch arm 73 progresses, the cam pin 84 (FIG. 5) rides down the curved cam surface 85 of the deadlatch arm operator 76. This, in turn, allows the bottom portion of the deadlatch arm 73 to fall vertically to its operative position behind the latch shaft button 64 shown in FIG. 4.

In this position of the deadlatch arm 73, the bottom section of the deadlatch arm 73 resides directly behind the latch shaft button 64. Any effort to force the main latch 37 into the door and out of the latch pocket when the door is closed causes the latch shaft button 64 to engage the bottom section of the deadlatch arm 73 thereby preventing further inward movement. As a result, forced back-drive of the main latch 37 by a would-be intruder is prevented when the door panel is closed whether or not the door knob is locked and whether or not the door is dead bolted.

However, when the door knob is unlocked and rotated, the retractor bars 61 begin to move to the left in FIG. 5 and the retractor fingers begin to pull on the latch shaft button 64 to retract the main latch 37. At the same time, a secondary cam pin 77 of the deadlatch arm 73 engages and rides up a ramp 78 formed on the upper retractor bar 61. This raises the deadlatch arm 73 so that the latch shaft button 64 clears the bottom section of the deadlatch arm 73. The main latch 37 is thus retracted by the rotating door knob so that the door can be unlatched and opened by a user in the normal way. In the retracted position, the main latch 37 is substantially within the unhinged edge of the door panel 21 (FIG. 1) such that a portion of the main latch 37 may extend from the unhinged edge in a gap between the unhinged edge and a door jamb (FIG. 4) but not extending a distance such that the main latch 37 interferes with the door panel 21 swinging between an open and closed position thereof.

Figure 6:
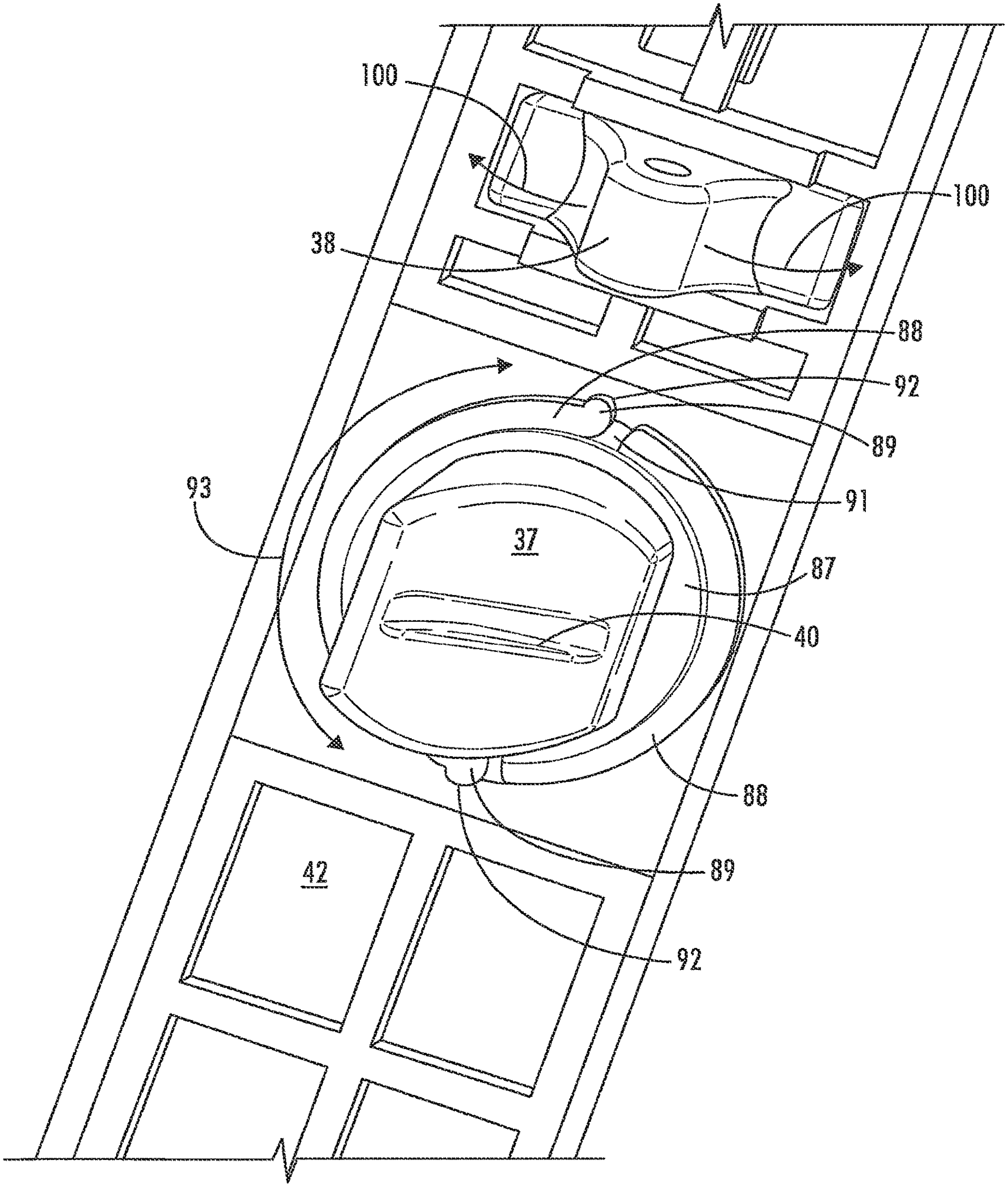
FIG. 6 is an edge perspective view of the latch bolt of the multipoint lock assembly with the edge plate of the assembly removed to show the handing reversal function of the latch bolt.

FIG. 6 shows the structure and function of the main latch 37 and the deadlatch button 38 in enlarged detail and with the face plate 36 of the latch and deadbolt assembly removed for clarity. The main latch 37 extends through an opening in the mortise box and is retractable in and out of the mortise box as described above. A latch retainer 87 surrounds the main latch 37 and normally is held in place by the face plate 36 (FIG. 2) of the assembly. The latch retainer 87 is formed with a pair of retainer springs 88 that project outwardly around the base of the retainer 87. Each retainer spring 88 is biased in a radially outward direction and includes a retainer spring tab 89 formed on the free end of the spring 88. The tabs 89 normally are nested within corresponding mortise detent notches 92 formed around the edge wall of the mortise in which the retainer springs reside.

Figure 6A:
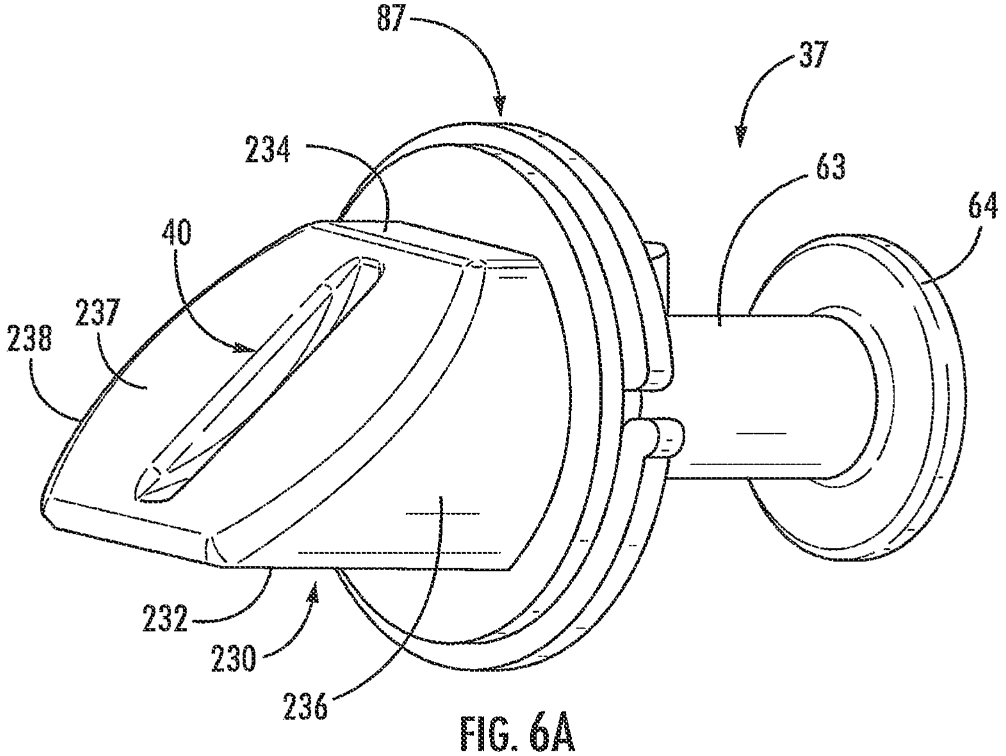
FIG. 6A is an enlarged side view of the main latch and the latch retainer of FIG. 6.

With additional reference to FIG. 6A, the outer portion 230 of the main latch 37 includes a first flat 232, a second flat 234, and an angled surface or face 237 that extends between an exterior terminal end of the first flat 232 to an exterior terminal end of the second flat 234. The angled face 237 includes an orientation adjustment slot 40 defined therein. The first and second flats 234 extend in a direction parallel to a longitudinal axis of the main latch 37 on opposite sides of the main latch 37. The main latch 37 may include arcuate surfaces 236, 238 that extend in a direction parallel to the longitudinal axis of the main latch 37 and between the first and second flats 232, 234. The angled face 237 is configured to engage a door jamb as the door panel 21 (FIG. 1) is swung to its closed position to urge the main latch 37 towards the retracted position such that the main latch 37 clears the door jamb before extending into a latch pocket 82 (FIG. 4) when the door panel 21 reaches its closed position. In the closed position, the first flat 232 engages the latch pocket 82 to maintain the door panel 21 in the closed position when the main latch 37 is in the extended position. The orientation of the angled surface 237 relative to the first and second faces of the door panel 21 (FIG. 1) may determine an orientation of the main latch 37.

Figure 6B:
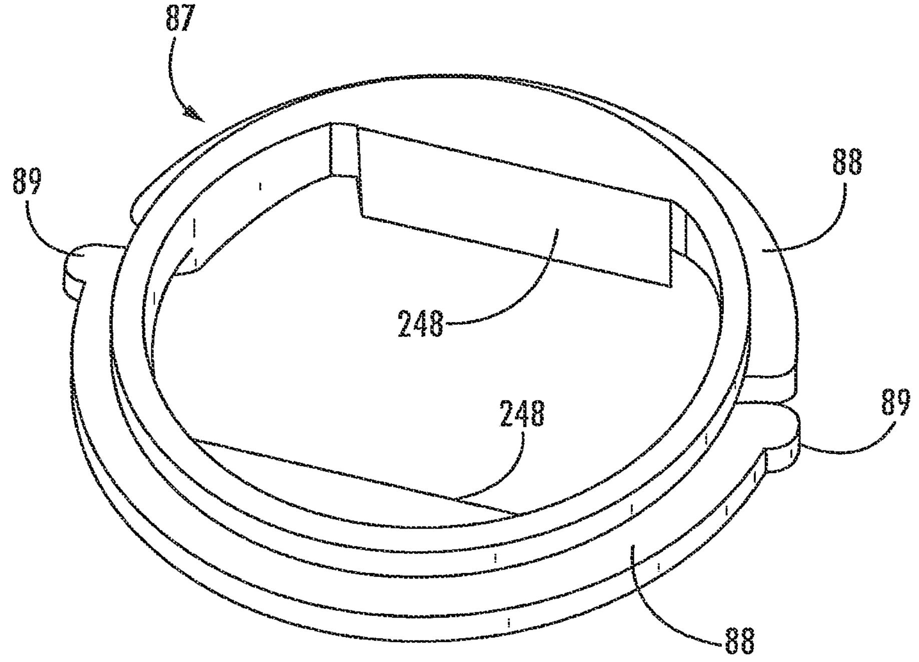
FIG. 6B is an enlarged perspective view of the latch retainer of FIG. 6A.

The main latch 37 is rotatable from a left-hand swing orientation to a right-hand swing orientation to correspond with the swing of a door panel 21 with which the assembly of this invention is used. To accomplish such an adjustment, a screw driver or other blade-like object is inserted into the adjustment slot 40 and twisted. This causes the spring tabs 89 to dislodge from their detents 92 allowing the main latch 37 and the latch retainer 87 to rotate as indicated by arrows 93 (FIG. 6). When the main latch 37 and the latch retainer 87 have rotated 180 degrees, the spring tabs 89 again lodge themselves in the corresponding detents to hold the main latch 37 in an orientation opposite from the original orientation. The assembly of this invention can thus be adjusted very easily for a left or right swing door panel without the need to remove and reposition the latch assembly. With particular reference to FIGS. 6A and 6B, the latch retainer 87 includes engagement flats 248 that engage the flats 232, 234 of the outer portion 230 of the main latch 37 to rotatably fix the latch retainer 87 to the main latch 37.

With continued reference to FIG. 6, the deadlatch button 38 is seen projecting from its opening in the mortise box 42. As described above, the deadlatch button bears on the spring biased deadlatch arm operator inside the mortise box and normally is urged by the operator to its fully extended position shown in FIG. 6. As the door panel closes, the deadlatch button 38 engages the door jamb, which pivots the deadlatch button to the left or the right (depending on the swing of the door panel) as indicated by arrows 100. This in turn causes the deadlatch arm 73 to drop thereby preventing forced back-drive of the main latch 37, as described in detail above. The deadlatch button 38 is symmetrical and can pivot in either direction 100 so that no adjustment of the deadlatch is required to accommodate a left or right swing door panel.

Figure 7:
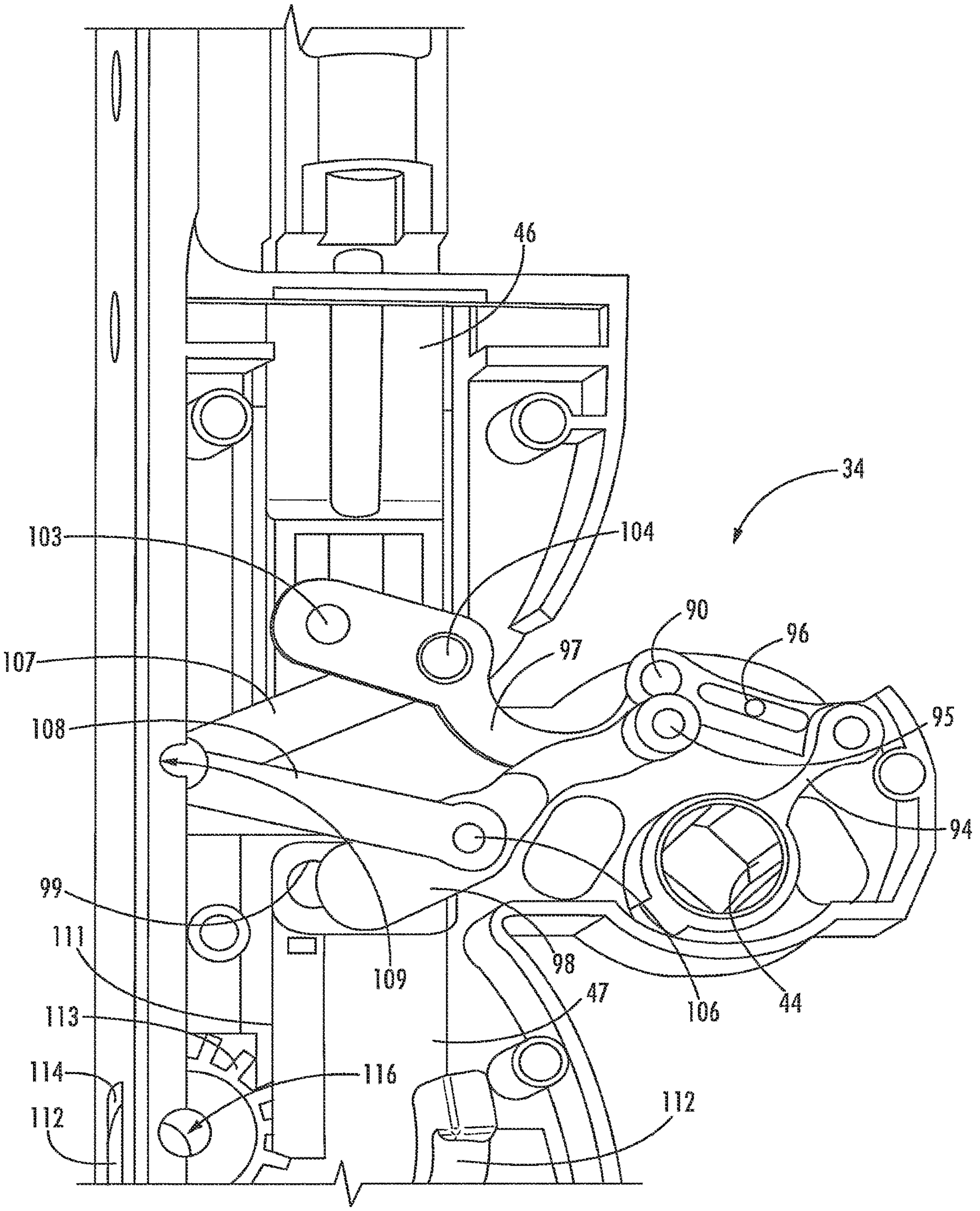
FIG. 7 is an enlarged side perspective view of the multipoint lock assembly showing a portion of the deadbolt and shoot bolt operator of the assembly in its unlocked condition.

Moving up from the main latch 37 assembly, FIG. 7 illustrates the deadbolt operating mechanism 34. The mechanism 34 comprises a deadbolt drive 44 that interfaces with a standard rotary deadbolt mechanism or deadbolt cylinder so that rotation of a key or thumb turn rotates the deadbolt drive 44. Drive linkage 94 projects from the deadbolt drive 44 and rotates therewith. The mechanism 34 includes a link arm 96, an upper drive bar link 97, a lower drive bar link 98, an upper scissor arm 107, and a lower scissor arm 108. The link arm 96 is pivotally coupled at its right end in FIG. 7 to the free end of the drive linkage 94 and is pivotally coupled via pivot pin 90 to the right end of upper drive bar link 97. The upper drive bar link 97 is pivotally coupled intermediate its ends to the right end of the upper scissor arm 107 via upper pivot pin 104. Upper drive pin 103 at the left end of the upper drive bar link 97 extends into a slot 102 (FIG. 9) in the upper drive bar 46

Lower drive bar link 98 is pivotally coupled at its right end in FIG. 7 to the upper drive bar link 97 via pivot pin 95. The left end of the lower drive bar link 98 includes a drive pin (not visible) that extends into a slot 99 in the lower drive bar 47 so that the lower drive bar link is slidably and pivotally coupled to the lower drive bar 47. The lower scissor arm 108 is pivotally coupled at its right end to the lower drive bar link 98 intermediate its ends via pivot pin 106. The left end of the upper scissor arm 107 and the lower scissor arm 108 are pivotable about a common pivot axis 109 on the mortise box 42.

Deadbolt rack 111 is formed on the upper end of lower drive bar 47. Deadbolt 112 is pivotally coupled to the mortise box 42 and is rotatable about a rotation axis 116. The deadbolt 112 is formed with a deadbolt pinion 113 that partially surrounds the rotation axis 116. Teeth of the deadbolt pinion mesh with the teeth of the deadbolt rack 111. It will thus be seen that when the lower drive bar 47 moves in a downward direction in FIG. 7, the action of the rack 111 and pinion 113 cause the deadbolt 112 to rotate clockwise about rotation axis 116. This, in turn, causes the deadbolt 112 to swing out of the deadbolt slot 114 and into an adjacent door jamb to deadbolt a door panel in its closed position.

Figure 8:
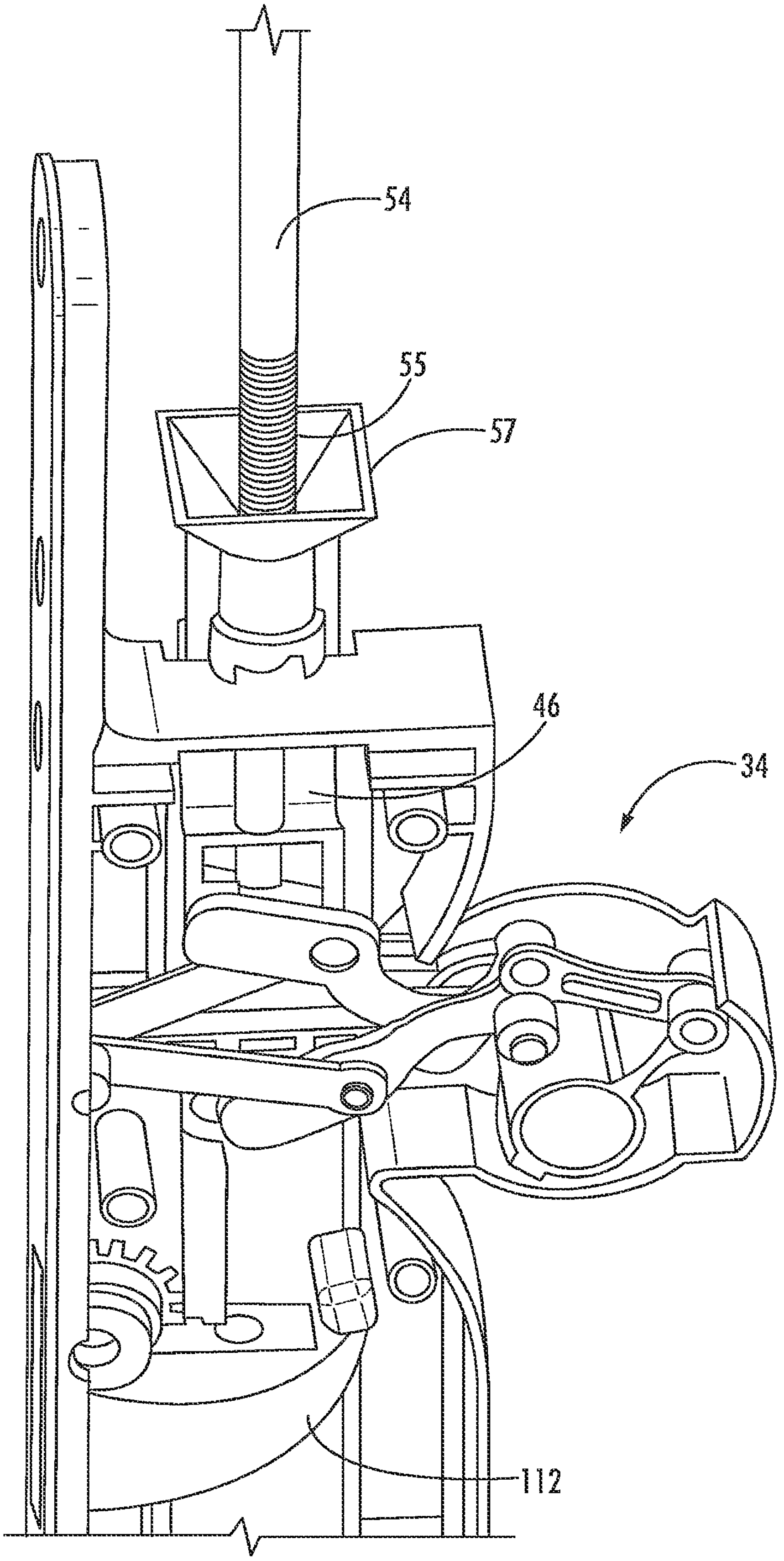
FIG. 8 is an enlarged perspective view from a slightly different angle of the multipoint lock assembly showing a portion of the deadbolt and shoot bolt operator of the assembly in its unlocked condition.

FIG. 8 shows the deadbolt operating mechanism 34 from a slightly different perspective and also shows the mechanism that couples the upper drive bar 46 to upper drive rod 54, which extends upwardly to the upper shoot bolt mechanism to be described below. The upper drive rod 54 is installed in a door panel by being slid through a tunnel formed in the door panel adjacent its unhinged edge. The threaded end 55 of the upper drive rod 54 is then threaded into the upper end of the upper drive bar 46 to attach the two together.

Since the joining of the upper drive rod and the upper drive bar is not accessible or visible during the attaching operation, the upper end of the upper drive bar 46 is formed with an upper drive bar dock 57. The upper drive bar dock 57 has walls that taper inwardly on all sides toward a threaded bore to which the threaded end 55 of the upper drive rod 54 is attached. Thus, the threaded end 55 of the upper drive rod 54 is guided into the threaded bore at the top of the upper drive bar 46. Upward movement of the upper drive bar 46 thereby causes the upper drive rod 54 to move up and vice versa.

Figure 9:
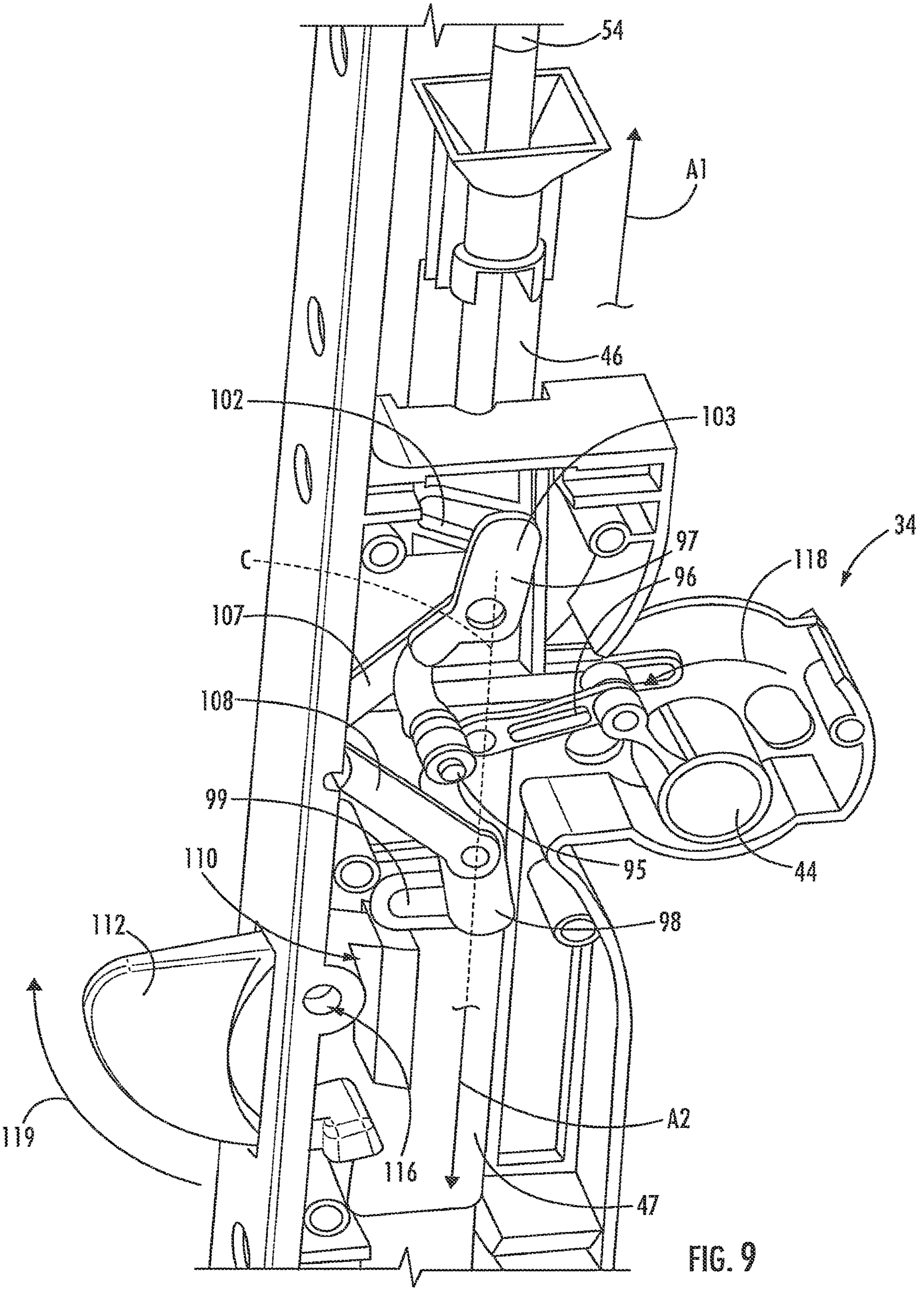
FIG. 9 is an enlarged perspective view of the multipoint lock assembly showing a portion of the deadbolt and shoot bolt operator of the assembly in its locked condition.
Figure 10:
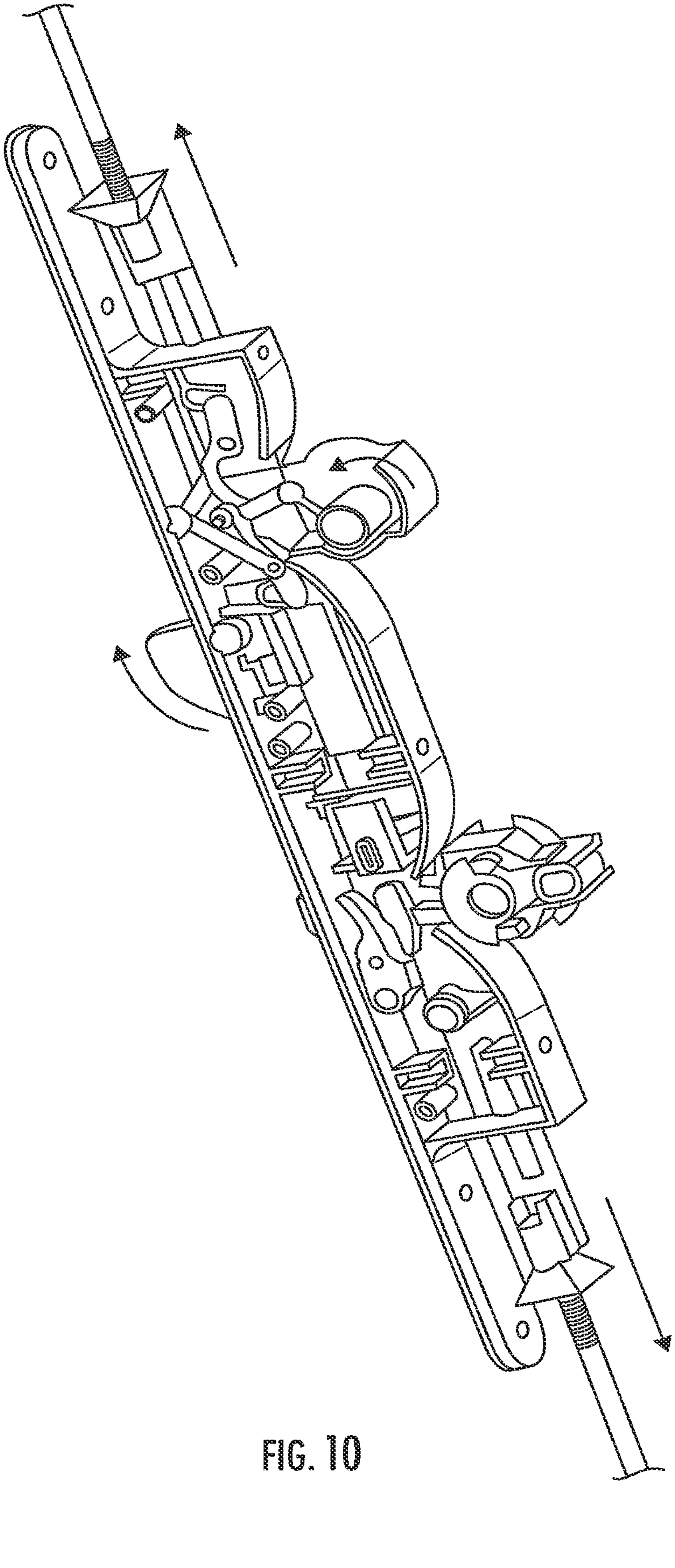
FIG. 10 is a rear side perspective view of the multipoint lock assembly with a portion of its casing removed and with the dead bolt and shoot bolts in their extended and locked positions.

FIGS. 7 and 8 show the deadbolt operating mechanism 34 in its unlocked configuration in which the deadbolt 112 and the upper and lower shoot bolts of assemblies 31 and 32 (FIG. 1) all are in their retracted positions. The door panel is unlocked. FIGS. 9 and 10 show the lock operating mechanism 34 in its locked configuration in which the deadbolt 112 and the upper and lower shoot bolts of assemblies 31 and 32 are in their extended positions. More specifically, the deadbolt drive 44 has been rotated in a counterclockwise direction as indicated by arrow 118. This, in turn, has driven link arm 96 to the left in FIG. 9, which has driven the lower end of the upper drive bar link 97 to the left.

The upper end of lower drive bar link 98, being pivotally connected to the upper drive bar link 97, also has been driven to the left as shown. The upper and lower scissor arms 107 and 108 have spread apart to accommodate the movement of the upper and lower drive bar links 107 and 108. The ultimate result of these coordinated movements is that the upper end of upper drive bar link 97 has moved up and the lower end of the lower drive bar link has moved down. This in turn has moved the upper drive bar 46 up as a result of pin 103 riding in slot 102 (arrow A1) and has moved the lower drive bar 47 down as a result of a pin (not visible) riding in slot 99 (arrow A2).

Upward movement of upper drive bar 46 also has driven upper drive rod 54 up to extend the upper shoot bolt of assembly 31 into the header of an entryway. Likewise, downward movement of lower drive bar 47 has driven the lower drive rod 56 down to extend the lower shoot bolt of assembly 32 into the threshold of an entryway. Operation of the upper and lower shoot bolts themselves is described in more detail below.

Downward movement of the lower drive bar 47 also has caused the deadbolt rack 110 to move down, which has, through engagement with the deadbolt pinion, rotated the deadbolt 112 outwardly as indicated by arrow 119. Coordinated movement of the deadbolt and shoot bolts is illustrated by arrows in FIG. 10. The door panel is thus locked in place at three points in this example, namely at the unhinged edge, the upper unhinged corner, and the lower unhinged corner.

A unique aspect of the mechanism 34 is that once it is locked and dead bolted, neither the deadbolt nor the shoot bolts can be forced by a would-be intruder to their retracted positions with a blade or other tool. This is because, when the mechanism is locked and dead bolted as shown in FIG. 9, the pivot pin 95 resides to the left of center line C, e.g., past center. Any attempt by force to move the upper drive bar down, to move the lower drive bar up, or to rotate the deadbolt 112 back down merely urges the pivot pin 95 further to the left rather than to the right. It can be said that the four bar linkage formed by the deadbolt operating mechanism 34 is past center. Movement to the right would retract the deadbolt and shoot bolts. The only way that the deadbolt and shoot bolts can be retracted is through a user intentionally unlocking the door panel by operating the deadbolt drive 44 to move the pivot pin 95 to the right, e.g., rotating a key, thumb turn, or another mechanism, which rotates the deadbolt drive 44 in a direction opposite to arrow 118. Once locked, the door is secure until unlocked. Further, as described above, forced back-drive of the main latch 37 also is prevented through action of the deadlatch mechanism 34.

FIGS. 11-13*a* illustrate the configuration and operation of the upper shoot bolt assembly 32 and these figures will be referenced together as a group. The upper shoot bolt assembly 32 is mounted in a mortise formed in the top corner of the door panel 21 at the unhinged edge. The assembly 32 includes a main body 122 and a cover plate 122*a*. A guide barrel 123 is rotatably mounted in the main body 122 and can be selectively rotated between indexed orientations. Indexing of the guide barrel 123 is facilitated by rotational position notches 131 (FIG. 13*a*) that engage with a rotational position detent 128 formed in the main body 122 as the guide barrel 123 is rotated. A wave washer 129 is disposed around the guide barrel and is normally sandwiched between the main body 122 and the cover plate 122*a*. The wave washer maintains downward bias on the guide barrel to hold it in a selected rotational position with the rotational position detent 128 engaged in one of the rotational position notches 131.

Figure 11:
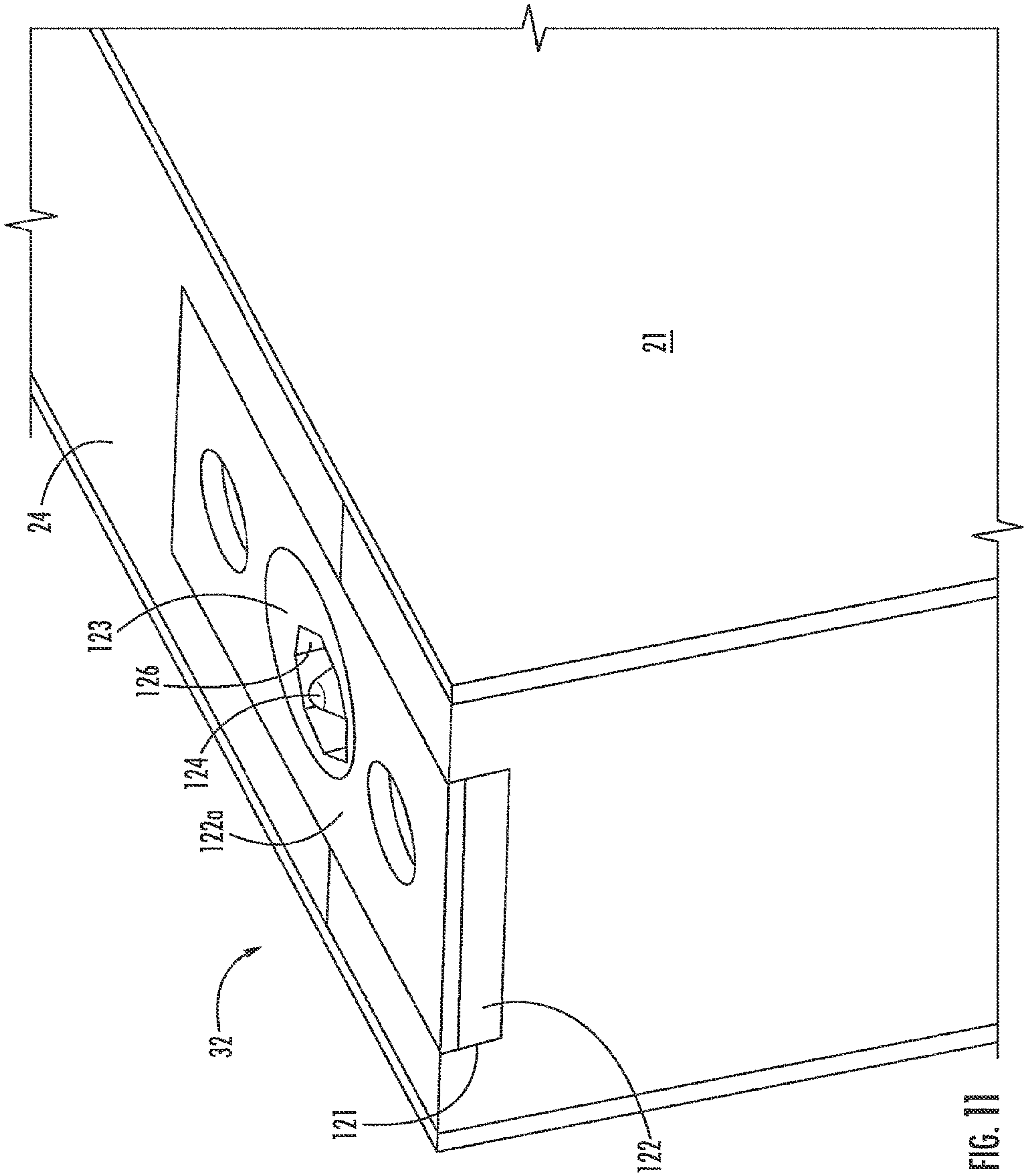
FIG. 11 is a perspective view of the top corner of the unhinged edge of a door showing a shoot bolt assembly according to principles of the invention.
Figure 12:
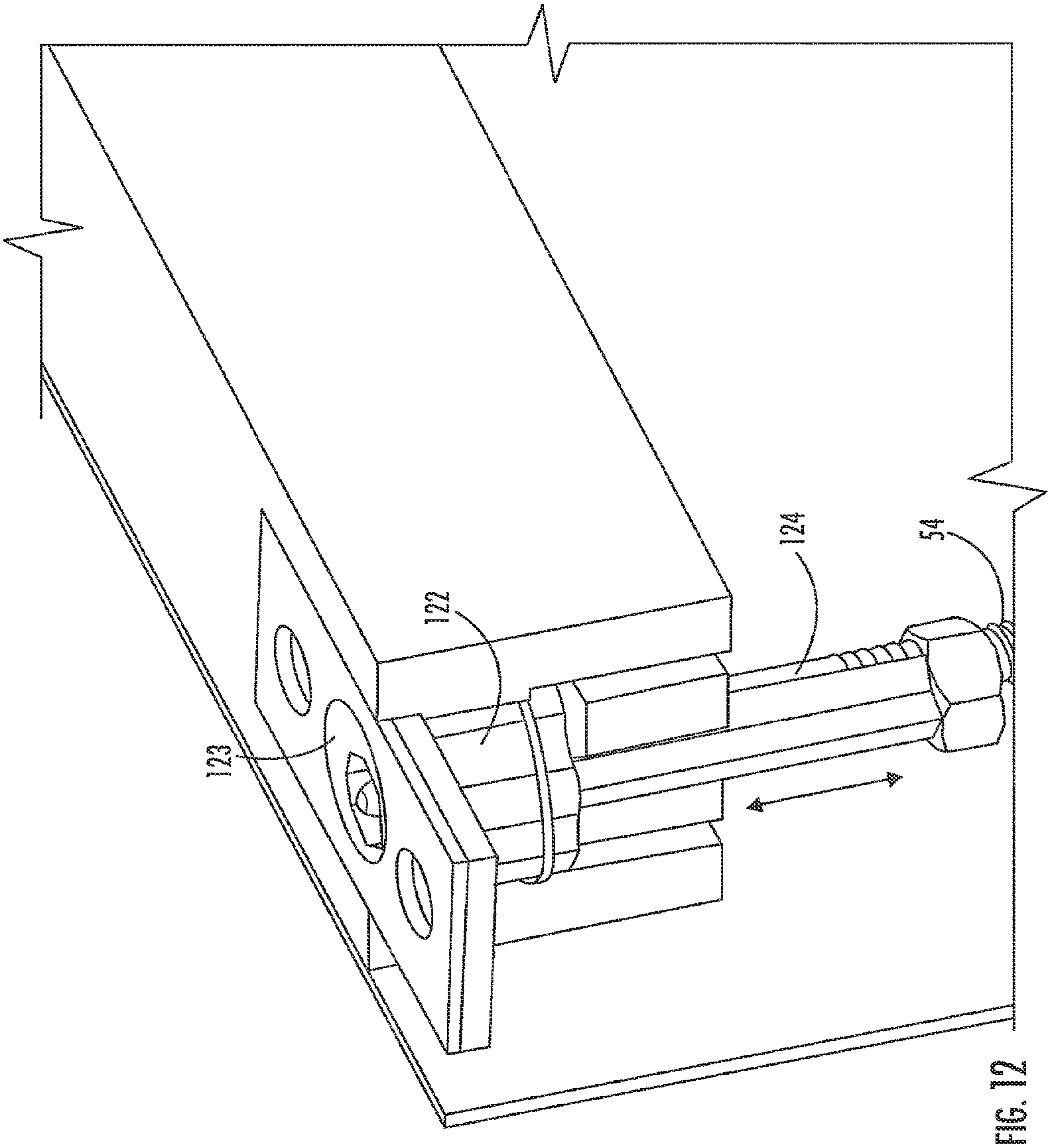
FIG. 12 is a perspective view of the top corner of the unhinged edge of a door with portions of the door panel removed to reveal details of the shoot bolt assembly mounted with the shoot bolt in its unlocked position.
Figure 13:
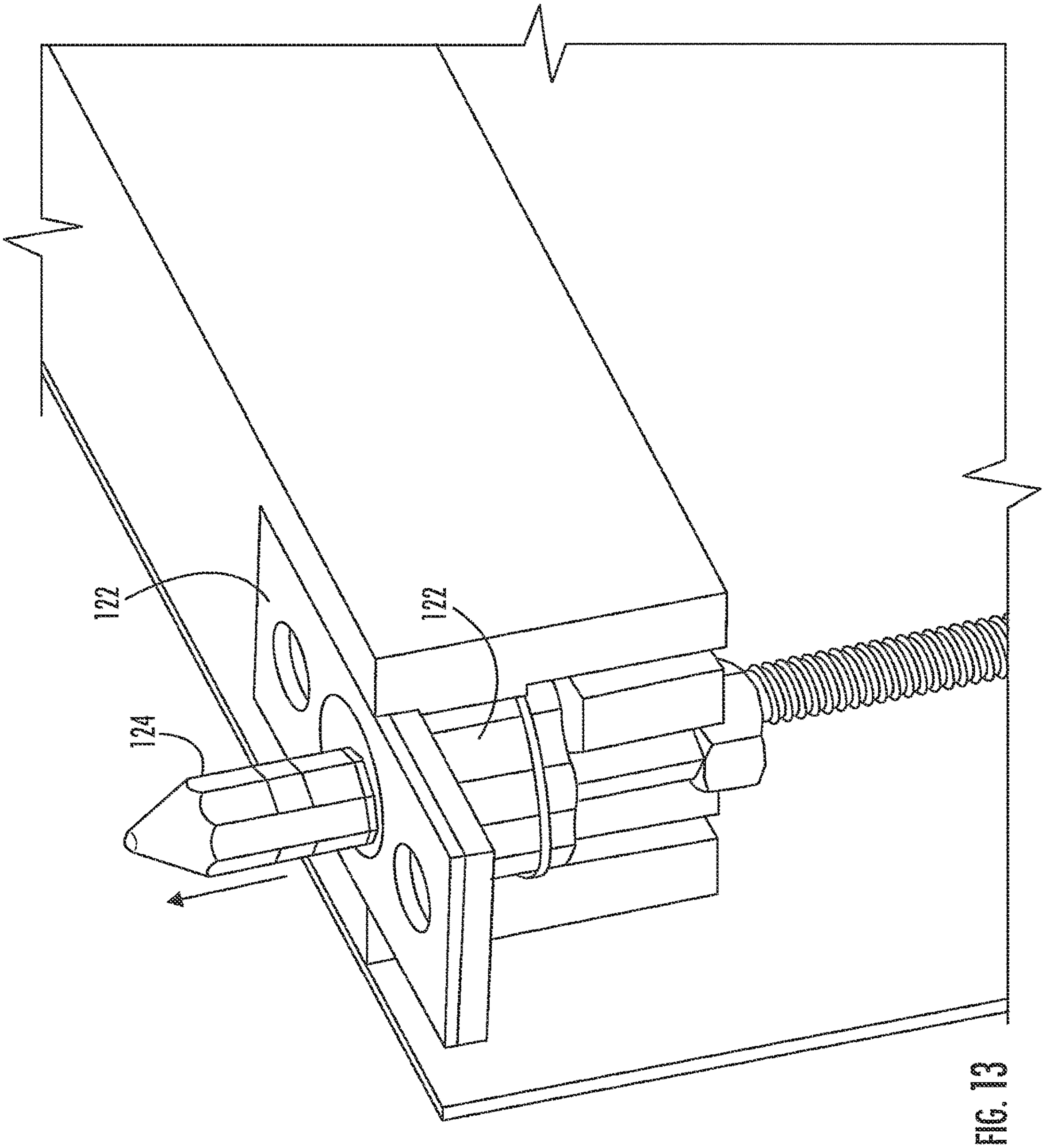
FIG. 13 is a perspective view of the top corner of the unhinged edge of a door with portions of the door panel removed to reveal details of the shoot bolt assembly mounted with the shoot bolt in its locked position.
Figure 13A:
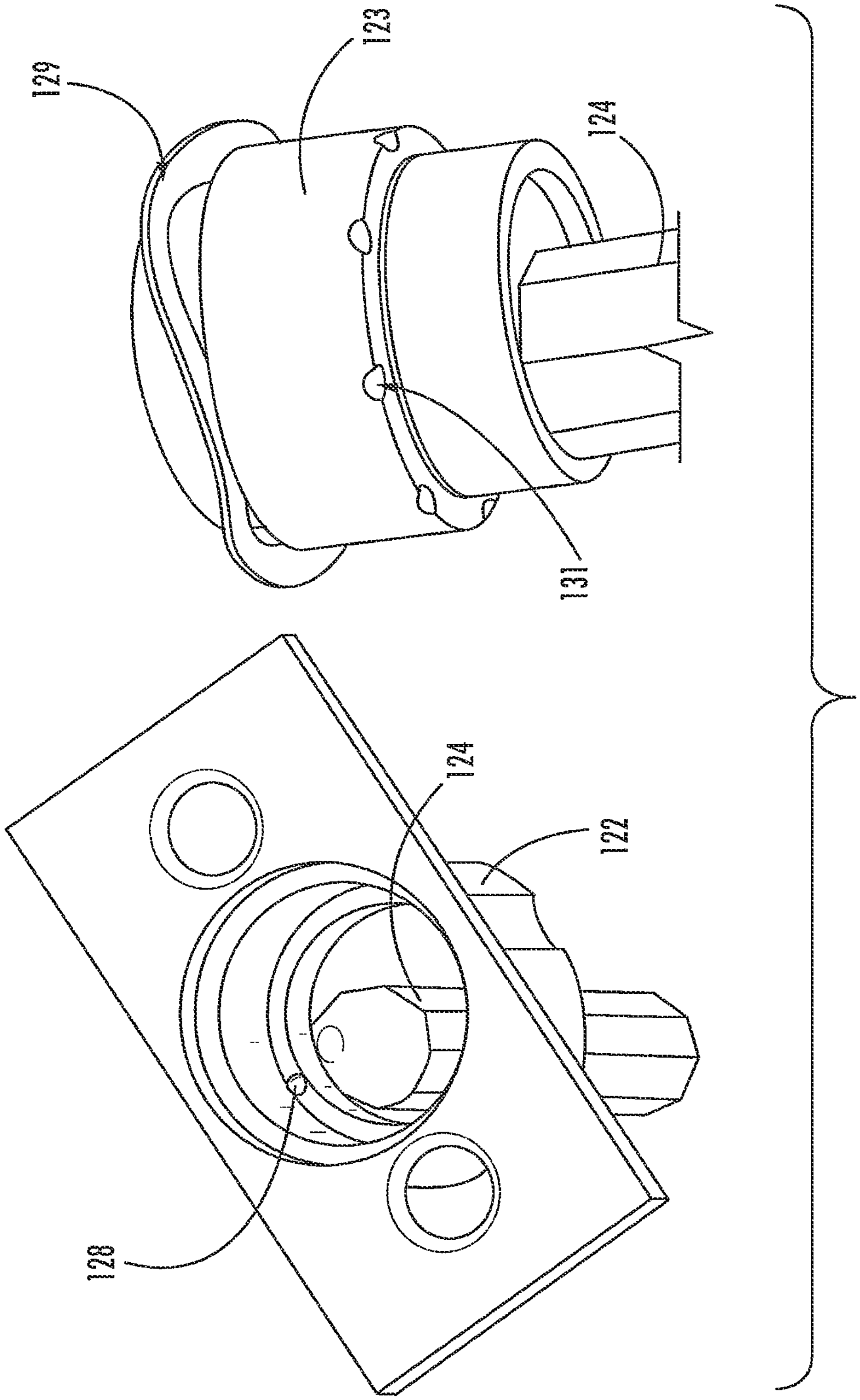
FIG. 13*a* shows perspective views of the components of the upper shoot bolt assembly illustrating the lateral position adjustability feature thereof.
Figure 14:
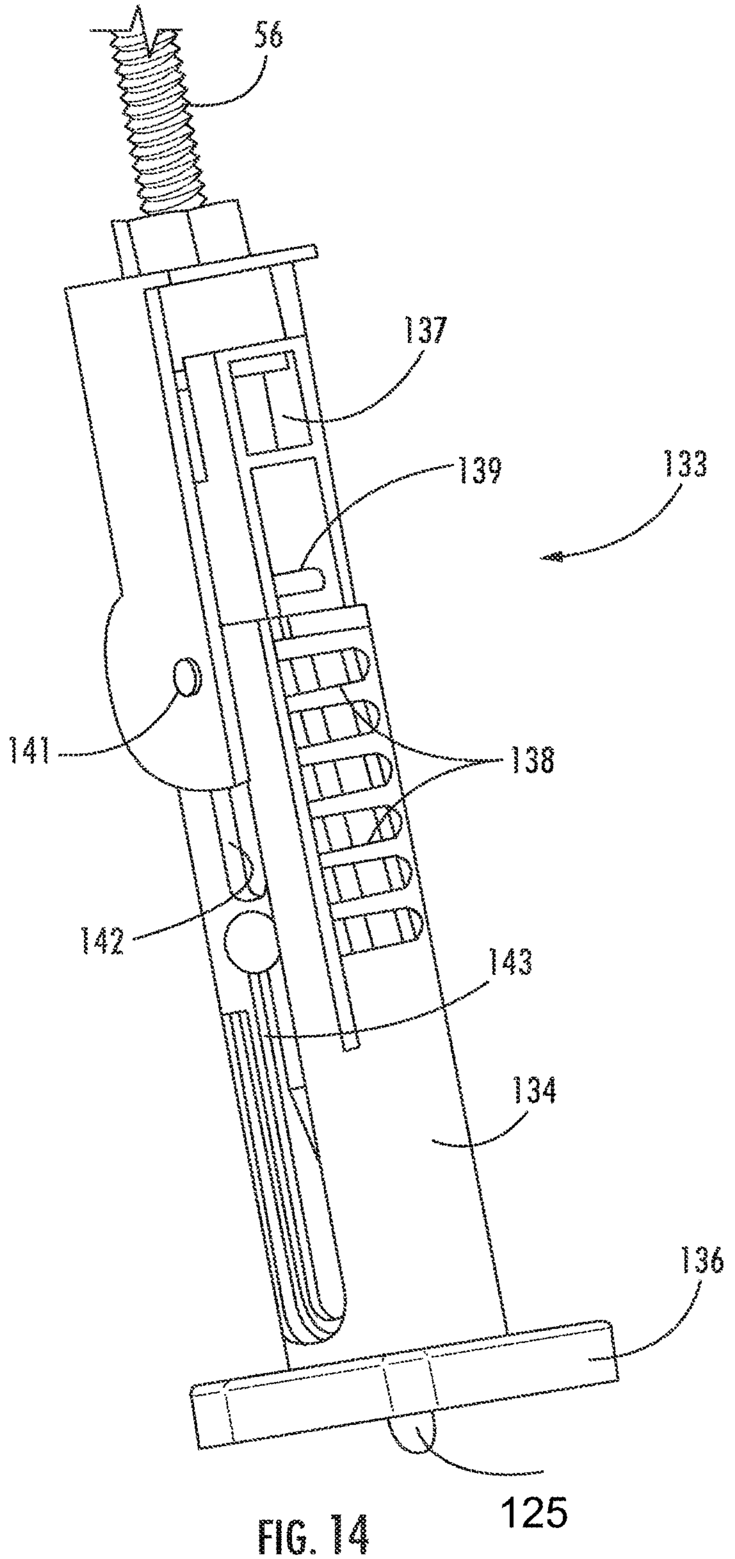
FIG. 14 is a perspective view of the bottom shoot bolt assembly according to principles of the invention with the bottom shoot bolt in its unlocked position.

A hexagonal sleeve 126 is formed through the guide barrel 123 and is offset relative to the central axis of the guide barrel as perhaps best shown in FIG. 11. The upper shoot bolt 124 also is hexagonal in shape and is slidably disposed within the hexagonal sleeve 126 of the guide barrel 123. The bottom end of the upper shoot bolt 124 is connected to the top end of the upper drive rod 54. Accordingly, when the upper drive rod 54 is extended by actuation of the lock operating mechanism 34, the upper shoot bolt 124 is moved from its retracted or unlocked position shown in FIG. 11 to its extended or locked position shown in FIG. 13.

Rotation of the shoot bolt 124 rotates the guide barrel 123 between its indexed positions. Since the hexagonal sleeve 126 is offset from the central axis of the guide barrel, such rotation adjusts the position of the upper shoot bolt between the two faces of the door panel. This allows precise positioning of the shoot bolt to accommodate any misalignment between the upper shoot bolt 124 and the shoot bolt receiving hole in a shoot bolt strike plate (not shown) into which the shoot bolt extends. As a result, adjustment of the closed and locked position of the door panel at its upper edge is easily accomplished by simple rotation of the upper shoot bolt and guide barrel to the appropriate indexed position.

FIGS. 14-17 illustrate the configuration of the lower shoot bolt assembly 133. The lower shoot bolt assembly 133 is quite different from the upper shoot bolt assembly just described. This is due primarily to the requirement that the lower shoot bolt 125 exhibits a longer throw than the upper shoot bolt 124. In other words, the lower shoot bolt 125 must extend downwardly into a door sill a distance that is greater than the distance traveled by the lower drive rod 56 when the deadbolt operating assembly is actuated. Keeping this in mind throughout the following detailed discussion will enhance the understanding of the structure and function of the lower shoot bolt assembly 133.

Lower shoot bolt assembly 133 comprises a fixed housing 134 terminating at its lower end in a mounting plate (136), which fits in a mortise formed in the bottom edge of a door panel. A drive housing 137 is disposed in the fixed housing 134 for axial movement therealong and is attached at its top end to the bottom end of lower drive rod 56. Vertical movement of the lower drive rod 56 causes corresponding axial movement of the drive housing 137 within the fixed housing 134. A gear rack 138 is formed along one side of the fixed housing 134. A drive gear 139 is rotatably mounted on an axle 141 within the drive housing 137. The teeth of the drive gear 139 engage the gear rack 138. It will thus be seen that axial movement of the drive housing 137 in the fixed housing 134 causes the drive gear 139 to rotate about axle 141. The axle 141 extends through opposed slots 142 in the fixed housing 134 to guide axial movement of the drive housing 137.

Figure 15:
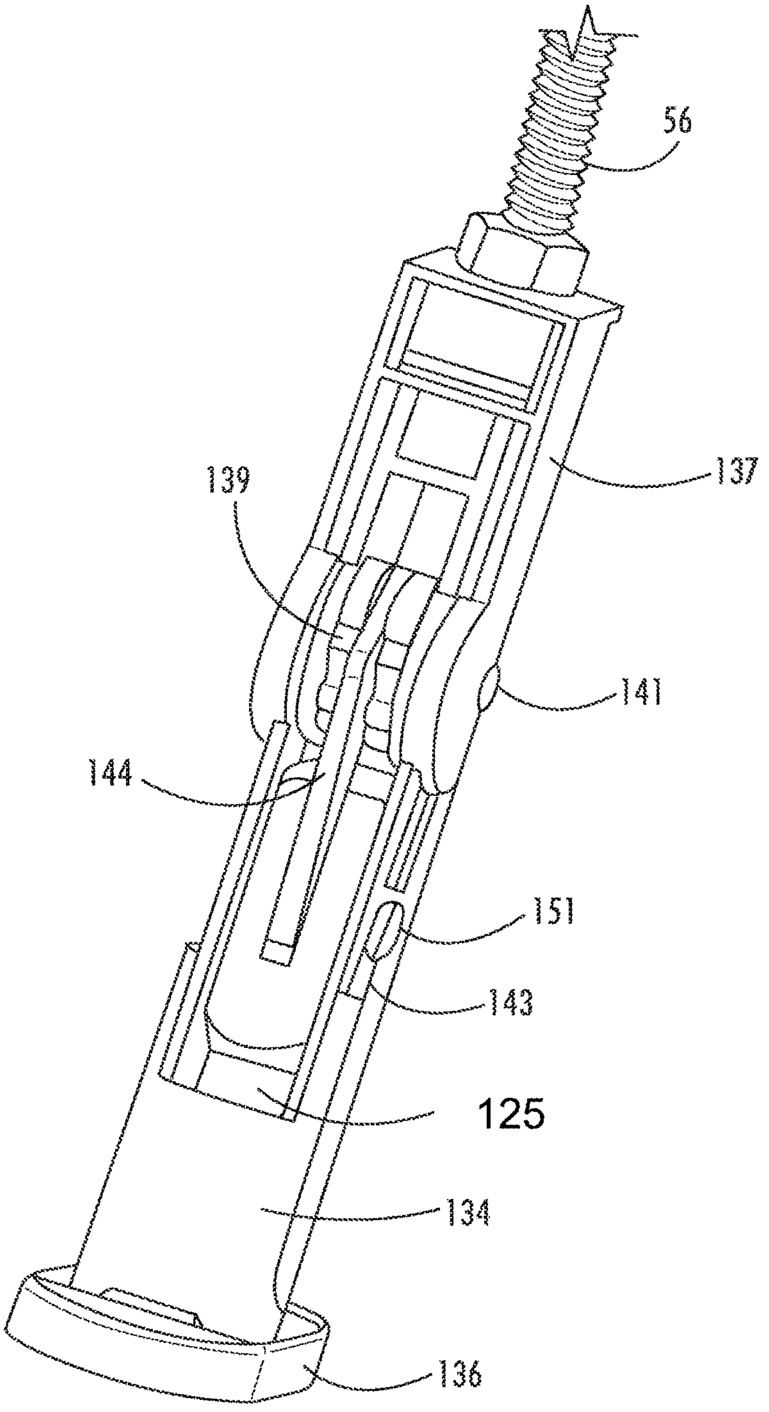
FIG. 15 shows the bottom shoot bolt assembly in a different orientation with the shoot bolt in its unlocked position.

As shown in FIG. 15, which is a view of the lower shoot bolt assembly from a different perspective, the lower shoot bolt 125 is slidably disposed within the fixed housing for axial movement therein. A drive link 144 is rotatably attached at its top end 146 to a lobe of the drive gear 139 and is rotatably attached at its bottom end 147 to the upper end of the lower shoot bolt 125. Pivot pin 151 attaches the drive link 144 to the lower shoot bolt 125 and its ends extend through slot 143 to guide axial movement of the lower shoot bolt 125. When the drive gear 139 rotates as a result of downward movement of the drive housing 137, the drive link 144 moves the lower shoot bolt 125 in a downward direction at a rate greater than the rate of movement of the drive housing 137. As a consequence, the distance traveled by the shoot bolt is greater than the distance traveled by the drive housing 137. In other words, the throw of the shoot bolt is greater than the distance moved by the drive housing 137.

Figure 16:
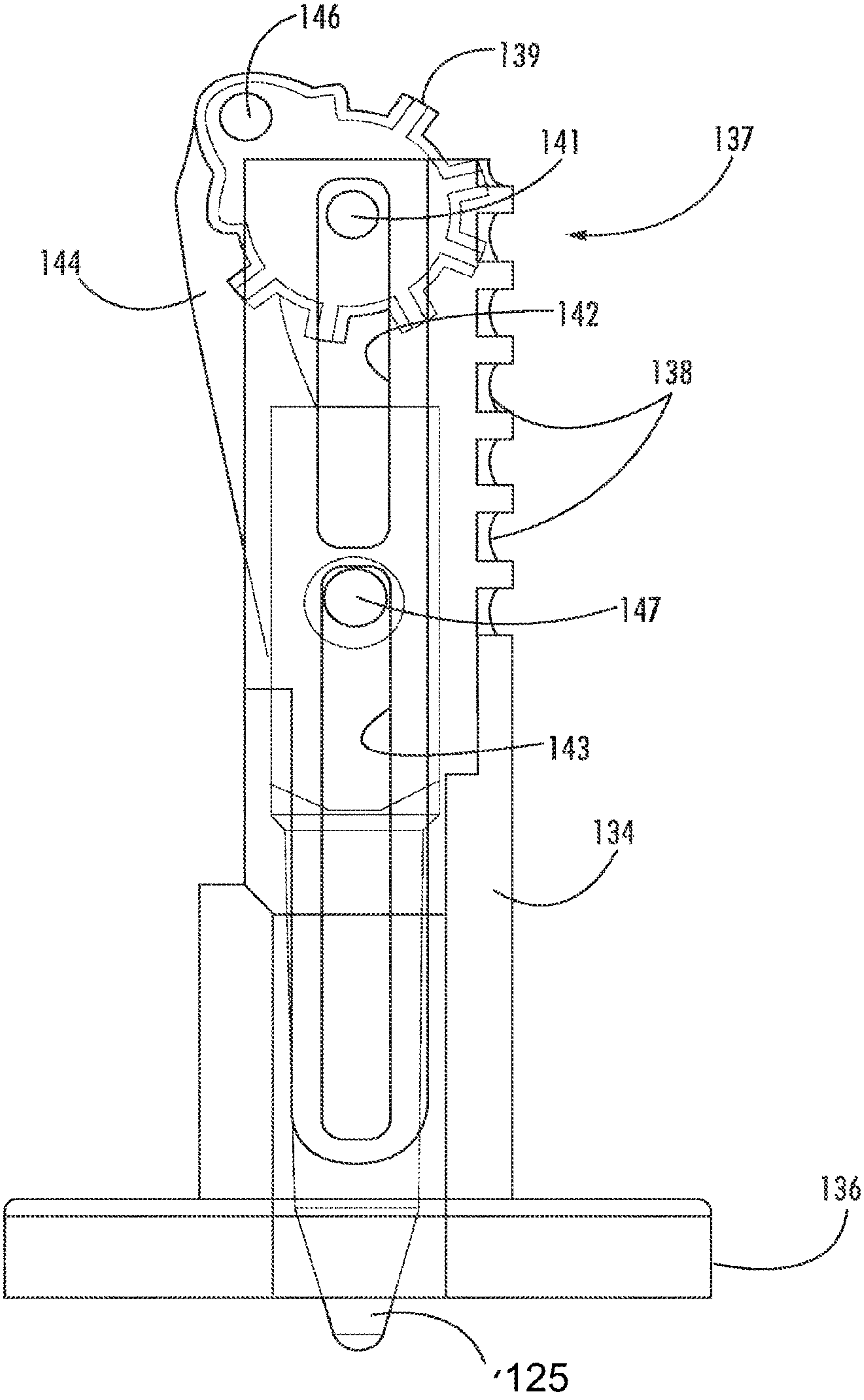
FIG. 16 is a side elevational view of the bottom shoot bolt assembly with selected components rendered transparent to show functional components of the assembly when the bottom shoot bolt in its unlocked position.
Figure 17:
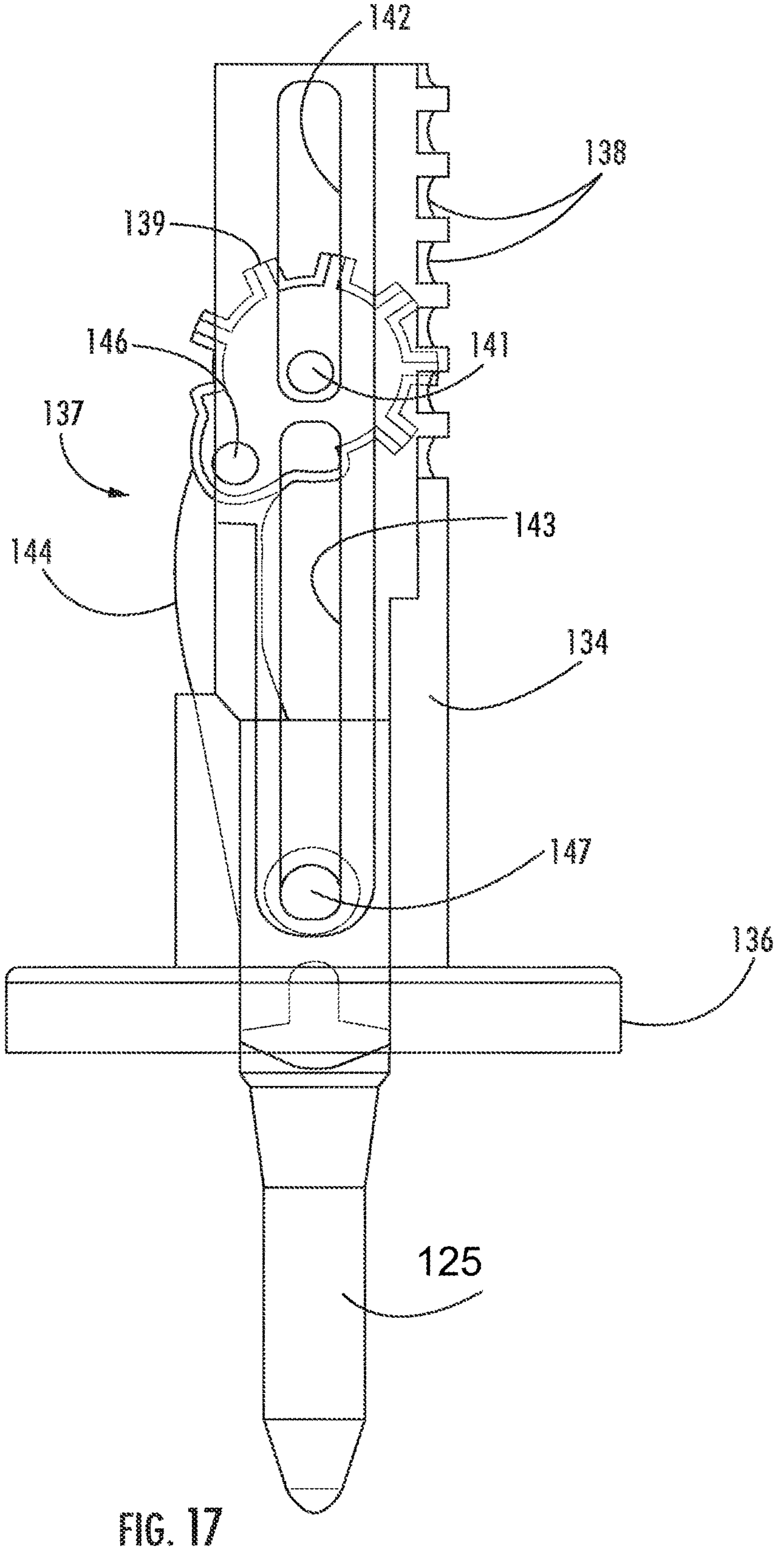
FIG. 17 is a side elevational view of the bottom shoot bolt assembly with selected components rendered transparent to show functional components of the assembly when the bottom shoot bolt in its locked position.

Operation of the lower shoot bolt assembly is illustrated in FIG. 16, which shows the assembly in its retracted or unlocked configuration, and in FIG. 17, which shows the assembly in its extended or locked configuration. In FIG. 16, the drive housing 137 is in its full-up position relative to the fixed housing 134. The drive gear 139 is rotated fully clockwise and the drive link 144 has pulled the lower shoot bolt 125 to its fully retracted or unlocked position. In FIG. 17, the drive housing 137 has been moved to its full-down position through activation by a user of the deadbolt drive as described above. The drive housing has been moved a distance equal to the length of the slot 142.

During this movement of the drive housing, the drive gear 139 is rotated in a counterclockwise direction by engagement with the gear rack 138 of the fixed housing. This, in turn, forces the drive link 144 downwardly, which moves the lower shoot bolt 125 to its extended locked position. However, the lower shoot bolt 125 has moved a distance equal to the length of slot 143 as a consequence of the drive gear and drive link interaction. This distance is greater than the length of travel of the drive housing 137. Accordingly, a greater throw is imparted to the lower shoot bolt than would be provided by a direct connection to the deadbolt drive. The high throw is desirable and ensures a more secure door panel when the multipoint locks are engaged.

The deadbolt mechanism 34 detailed above is shown with a deadbolt 39 that extends from the unhinged edge, an upper shoot bolt 31 that extends from the top edge, and a lower shoot bolt 32 that extends from the bottom edge; however, in some embodiments, the deadbolt mechanism 34 may include a deadbolt, a first auxiliary latch, and a second auxiliary latch that each extend from the unhinged edge in a manner similar to the deadbolt with the first auxiliary latch above the deadbolt and the second auxiliary latch below the deadbolt and a main latch.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A lock mechanism assembly configured to be disposed within a mortise pocket of a door, the lock mechanism assembly comprising:

- a main latch operating mechanism configured to extend a main latch from a lock edge of the door such that the main latch secures the door in a closed position thereof and to retract the main latch into the mortise pocket of the door such that the door is moveable from the closed position thereof;
- a deadbolt operating mechanism having a first drive bar configured to couple to and extend a first auxiliary retainer from a top or a bottom edge of the door such that the first auxiliary retainer secures the door in the closed position thereof;
- a first dock defining a receptacle, the receptacle inwardly tapered towards the first drive bar such that the first dock is configured to guide a drive rod therethrough into the first drive bar of the deadbolt operating mechanism; and
- an upper auxiliary retainer guide comprising:
  - a main body defining a passage having a central axis, the main body disposed in the top edge of the door panel such that the upper auxiliary retainer extends from the top edge of the door panel through the passage, and
  - a guide barrel defining a sleeve having a sleeve axis, the guide barrel rotatably mounted in the passage of the main body with the sleeve axis offset from the central axis such that rotation of the sleeve within the passage adjusts a position of the upper auxiliary retainer relative to the first face and the second face of the door panel.

2. The lock mechanism assembly according to claim 1, wherein the first drive bar defines a bore configured to receive and couple to a drive rod end of the drive rod.

3. The lock mechanism assembly according to claim 2, wherein the first dock is attached to the first drive bar such that the first dock and the bore are coaxially aligned.

4. The lock mechanism assembly according to claim 2, wherein the first dock is disposed about the bore of the first drive bar, the first dock having a proximal end adjacent the bore and a distal end spaced apart from the bore, the first dock being tapered from the distal end to the proximal end such that the distal end has a greater dimension than the proximal end.

5. The lock mechanism assembly according to claim 2, wherein the bore is configured to threadably receive the drive rod end to the first drive bar.

6. The lock mechanism assembly according to claim 1, wherein the first dock has a plurality of walls defining the receptacle, the receptacle having a first end adjacent to the first drive bar and a second end opposite the first end spaced from the first drive bar, the plurality of walls tapered inwardly such that the first end has a first dimension and the second end has a second dimension greater than the first dimension.

7. The lock mechanism assembly according to claim 1, wherein the first dock is formed as a four-sided pyramidal frustum.

8. The lock mechanism assembly according to claim 1, wherein the first dock is attached to the first drive bar such that the first dock translates with the with drive bar as the drive bar extends the first auxiliary retainer from the top or the bottom edge of the door.

9. A door panel assembly comprising:

- a door panel having a hinged edge, a lock edge, a top edge, a bottom edge, a first face, and a second face, the hinged edge configured to be secured by hinges to a door frame, the door panel including a mortise pocket defined between the first face and the second face adjacent the lock edge;
- a lock mechanism disposed within the mortise pocket, the lock mechanism comprising:
  - an upper auxiliary retainer;
  - an upper drive rod extending from the upper auxiliary retainer to an upper drive rod end;
  - a main latch operating mechanism configured to extend a main latch from the lock edge of the door panel such that the main latch secures the door panel in a closed position thereof and to retract the main latch into the mortise pocket of the door panel such that the door panel is moveable from the closed position thereof;
  - a deadbolt operating mechanism having an upper drive bar coupled to the upper drive rod end such that the upper drive bar is configured to extend the upper auxiliary retainer from the top edge of the door panel such that the upper auxiliary retainer secures the door panel in the closed position thereof;
  - an upper dock configured to guide the upper drive rod end into the upper drive bar of the deadbolt operating mechanism; and
  - an upper auxiliary retainer guide comprising:
    - a main body defining a passage having a central axis, the main body disposed in the top edge of the door panel such that the upper auxiliary retainer extends from the top edge of the door panel through the passage; and
    - a guide barrel defining a sleeve having a sleeve axis, the guide barrel rotatably mounted in the passage of the main body with the sleeve axis offset from the central axis such that rotation of the sleeve within the passage adjusts a position of the upper auxiliary retainer relative to the first face and the second face of the door panel.

10. The door panel assembly according to claim 9, wherein the upper dock has a plurality of walls defining a receptacle, the receptacle having a first end adjacent to the upper drive bar and a second end opposite the first end spaced apart from the upper drive bar, the plurality of walls tapered inwardly such that the first end has a first dimension and the second end has a second dimension greater than the first dimension.

11. The door panel assembly according to claim 10, wherein the first end of the upper dock defines a circular aperture and the second end of the upper dock defines a rectangular aperture.

12. The door panel assembly according to claim 9, wherein the door panel defines a tunnel between the first face and the second face, the tunnel extending from the top edge of the door panel to the mortise pocket spaced apart from the lock edge of the door panel.

13. The door panel assembly according to claim 12, wherein the upper dock is disposed within the mortise pocket and in communication with the tunnel to receive the upper drive rod end of the upper auxiliary retainer therethrough.

14. The door panel assembly according to claim 9, further comprising a deadbolt coupled to the deadbolt operating mechanism such that the deadbolt operating mechanism is configured to the extend the deadbolt from the lock edge of the door panel such that the deadbolt secures the door panel in the closed position thereof.

15. The door panel assembly according to claim 14, further comprising:

a lower auxiliary retainer;

a lower drive rod extending from the lower auxiliary retainer to a lower drive rod end;

a lower drive bar of the deadbolt operating mechanism, the lower drive bar coupled to the lower drive rod end of the lower drive rod such that the lower drive bar is configured to extend the lower auxiliary retainer from the bottom edge of the door panel such that the lower auxiliary retainer secures the door panel in the closed position thereof, and a lower dock configured to guide the lower drive rod end of the lower drive rod into the lower drive bar of the deadbolt operating mechanism.

16. The door panel assembly according to claim 15, wherein actuation of the deadbolt operating mechanism translates the upper auxiliary retainer and the lower auxiliary retainer, the upper auxiliary retainer translated a first distance such that the upper auxiliary retainer extends from the top edge of the door panel and the lower auxiliary retainer translated a second distance greater than the first distance such that the lower auxiliary retainer extends from the bottom edge of the door panel.

17. The door panel assembly according to claim 15, wherein the deadbolt operating mechanism further comprises a linkage assembly configured to increase rotational force applied thereto such that the force required to simultaneously extend the deadbolt, the upper auxiliary retainer, and the lower auxiliary retainer from a respective edge of the door panel is reduced, the linkage assembly comprising:

an upper drive bar link coupled to the upper drive bar;

a lower drive bar link coupled to the lower drive bar; and a drive linkage configured to actuate the deadbolt operating mechanism in response to rotation of a standard rotary deadbolt mechanism, the drive linkage operably connected to the upper drive bar link and the lower drive bar link such that actuation of the deadbolt operating mechanism extends the deadbolt, the upper auxiliary retainer, and the lower auxiliary retainer from a respective edge of the door panel.

18. The door panel assembly according to claim 17, wherein when the deadbolt, the upper auxiliary retainer, and the lower auxiliary retainer are extended from a respective edge of the door panel the linkage assembly is in a past center configuration preventing back driving of the deadbolt, the upper auxiliary retainer, and the lower auxiliary retainer.

19. A method of installing a lock mechanism in a door panel, the method comprising:

inserting a body of the lock mechanism into a mortise pocket of the door panel, the body of the lock mechanism including a deadbolt operating mechanism, an upper dock, and an upper auxiliary retainer guide having a main body defining a passage with a central axis and a guide barrel defining a sleeve with a sleeve axis offset from the central axis;

inserting an upper auxiliary retainer through a top edge of the door panel into a first tunnel spaced apart from a lock edge of the door panel such that the upper auxiliary retainer is guided into the deadbolt operating mechanism by the upper dock;

securing the upper auxiliary retainer in the deadbolt operating mechanism;

disposing the main body of the upper auxiliary retainer guide in the top edge of the door panel such that the upper auxiliary retainer extends from the t op edge of the door panel through the passage, wherein the guide barrel is rotatably mounted in the passage such that rotation of the sleeve within the passage adjusts a position of the upper auxiliary retainer relative to a first face and a second face of the door panel; and operating the deadbolt operating mechanism to transition the upper auxiliary retainer between a retracted position in which the upper auxiliary retainer is disposed within the door panel and an extended position in which the upper auxiliary retainer extends from the top edge of the door panel.

* * * * *